(12) United States Patent
Nojiri et al.

(10) Patent No.: US 12,311,837 B2
(45) Date of Patent: May 27, 2025

(54) VEHICLE NOTIFICATION CONTROL DEVICE AND VEHICLE NOTIFICATION CONTROL METHOD

(71) Applicant: DENSO CORPORATION, Kariya (JP)

(72) Inventors: Shota Nojiri, Kariya (JP); Shiori Maneyama, Kariya (JP); Kazuki Izumi, Kariya (JP); Takuya Kume, Kariya (JP)

(73) Assignee: DENSO CORPORATION, Kariya (JP)

( * ) Notice: Subject to any disclaimer, the term of this patent is extended or adjusted under 35 U.S.C. 154(b) by 56 days.

(21) Appl. No.: 18/489,069

(22) Filed: Oct. 18, 2023

(65) Prior Publication Data

US 2024/0042926 A1 Feb. 8, 2024

Related U.S. Application Data

(63) Continuation of application No. PCT/JP2022/018611, filed on Apr. 22, 2022.

(30) Foreign Application Priority Data

Apr. 27, 2021 (JP) .................................. 2021-075156
Apr. 14, 2022 (JP) .................................. 2022-067144

(51) Int. Cl.
*B60Q 1/50* (2006.01)
*B60Q 5/00* (2006.01)
(Continued)

(52) U.S. Cl.
CPC .......... *B60Q 1/543* (2022.05); *B60Q 1/5037* (2022.05); *B60Q 1/507* (2022.05); *B60Q 5/006* (2013.01);
(Continued)

(58) Field of Classification Search
CPC ...... B60Q 1/543; B60Q 1/5037; B60Q 1/507; B60Q 5/006; B60W 30/12;
(Continued)

(56) References Cited

U.S. PATENT DOCUMENTS 9,809,158 B2 * 11/2017 Geller ................... B60Q 1/507
10,000,152 B1 * 6/2018 Scalea ................... B60Q 5/006
(Continued)

FOREIGN PATENT DOCUMENTS

JP 2014069671 A 4/2014
JP 2015182624 A 10/2015
(Continued)

OTHER PUBLICATIONS

U.S. Appl. No. 18/489,139, filed Oct. 18, 2023, Shota Nojiri et al.
(Continued)

*Primary Examiner* — Mohamed Barakat
(74) *Attorney, Agent, or Firm* — Harness, Dickey & Pierce, P.L.C.

(57) ABSTRACT

By a vehicle control notification device or a vehicle control notification method, an automated driving-related state of a vehicle is identified, a vehicle exterior notification device is controlled for performing vehicle exterior notification that is notification of information related to the automated driving toward an outside of the vehicle, and a type of the vehicle exterior notification is changed according to the identified automated driving-related state.

23 Claims, 16 Drawing Sheets

(51) Int. Cl.
*B60W 30/12* (2020.01)
*B60W 30/18* (2012.01)
*B60W 40/08* (2012.01)
*B60W 50/14* (2020.01)
*B60W 60/00* (2020.01)
*G06V 20/59* (2022.01)

(52) U.S. Cl.
CPC ...... *B60W 30/12* (2013.01); *B60W 30/18163* (2013.01); *B60W 40/08* (2013.01); *B60W 50/14* (2013.01); *B60W 60/0015* (2020.02); *G06V 20/597* (2022.01); *B60W 2040/0818* (2013.01); *B60W 2050/143* (2013.01); *B60W 2050/146* (2013.01); *B60W 2420/403* (2013.01); *B60W 2540/225* (2020.02); *B60W 2540/229* (2020.02); *B60W 2554/4029* (2020.02)

(58) Field of Classification Search
CPC .......... B60W 30/18163; B60W 40/08; B60W 50/14; B60W 60/0015; B60W 2040/0818; B60W 2050/146; B60W 2420/403; G06V 20/597

See application file for complete search history.

(56) References Cited

U.S. PATENT DOCUMENTS

| | | | |
|---|---|---|---|
| 10,994,712 B2* | 5/2021 | Oba | G08G 1/0965 |
| 11,307,583 B2* | 4/2022 | Gury | G05D 1/0088 |
| 2017/0124781 A1* | 5/2017 | Douillard | G08G 1/207 |
| 2018/0304804 A1 | 10/2018 | Tatara et al. | |
| 2019/0202357 A1* | 7/2019 | Takii | G08G 1/0962 |
| 2019/0258253 A1* | 8/2019 | Tremblay | G01C 21/3617 |
| 2020/0307631 A1* | 10/2020 | Tsuji | B60T 17/22 |

FOREIGN PATENT DOCUMENTS

| JP | 2017007417 A | 1/2017 |
|---|---|---|
| JP | 2019119289 A | 7/2019 |
| WO | WO-2017073632 A1 | 5/2017 |
| WO | WO-2019035433 A1 | 2/2019 |

OTHER PUBLICATIONS

U.S. Appl. No. 18/489,413, filed Oct. 18, 2023, Shota Nojiri et al.

* cited by examiner

FIG. 9

| AUTOMATION LEVEL | VE EXTERIOR NOTIFICATION TYPE |
|---|---|
| HANDS-ON LV2 OR LOWER | BLINK (SHORT LIGHTING TIME) |
| HANDS-OFF LV2 | BLINK (LONG LIGHTING TIME) |
| LV3 | LIGHTING |

FIG. 10

| AUTOMATION LEVEL | VE EXTERIOR NOTIFICATION TYPE |
|---|---|
| TRAFFIC CONGESTION LIMIT LV3 | BLINK |
| AREA LIMIT LV3 | LIGHTING |

FIG. 11

| DURATION | VE EXTERIOR NOTIFICATION TYPE |
|---|---|
| 10 MINUTES OR MORE | LIGHTING |
| LESS THAN 10 MINUTES | BLINK |

| AUTOMATION LEVEL | VE EXTERIOR NOTIFICATION TYPE |
|---|---|
| INCREASE | FADE-IN |
| DECREASE | FADE-OUT |

| CONTROL DURING AUTOMATED DRIVING | VE EXTERIOR NOTIFICATION TYPE |
|---|---|
| LTC CONTROL | LIGHTING |
| LCA CONTROL | BLINK |

| STATE DURING LCA CONTROL | VE EXTERIOR NOTIFICATION TYPE | TURN LAMP STATE |
|---|---|---|
| WITH MONITORING OBLIGATION | — | BLINK |
| WITHOUT MONITORING OBLIGATION | BLINK | BLINK |

| LV3 OR MORE EXECUTION PLACE | PASSERBY DETECTION | VE EXTERIOR NOTIFICATION TYPE |
|---|---|---|
| GENERAL ROAD | DETECTED | VOICE |
| | NOT DETECTED | — |
| EXPRESSWAY | | DISPLAY OR LIGHT EMISSION |

| EVACUATION ACTION | VE EXTERIOR NOTIFICATION TYPE |
|---|---|
| YES | RED · BLINK |
| NO | BLUE · LIGHTING |

VEHICLE NOTIFICATION CONTROL DEVICE AND VEHICLE NOTIFICATION CONTROL METHOD

CROSS REFERENCE TO RELATED APPLICATIONS

The present application is a continuation application of International Patent Application No. PCT/JP2022/018611 filed on Apr. 22, 2022, which designated the U.S. and claims the benefit of priority from Japanese Patent Application No. 2021-075156 filed on Apr. 27, 2021 and the benefit of priority from Japanese Patent Application No. 2022-067144 filed on Apr. 14, 2022. The entire disclosures of all of the above applications are incorporated herein by reference.

TECHNICAL FIELD

The present disclosure relates to a vehicle notification control device and a vehicle notification control method.

BACKGROUND

In a technology of a comparative example, a display device is attached to a roof of a subject vehicle and displays a state of "during automated driving" while the subject vehicle performs the automated driving.

SUMMARY

By a vehicle control notification device or a vehicle control notification method, an automated driving-related state of a vehicle is identified, a vehicle exterior notification device is controlled for performing vehicle exterior notification that is notification of information related to the automated driving toward an outside of the vehicle, and a type of the vehicle exterior notification is changed according to the identified automated driving-related state.

BRIEF DESCRIPTION OF DRAWINGS

FIG. 9 is a diagram for illustrating an example of the vehicle exterior notification when the type of vehicle exterior notification is changed according to an automation level.
FIG. 10 is a diagram for illustrating an example of changing the type of vehicle exterior notification during area limit automated driving and during traffic congestion limit automated driving.
FIG. 11 is a diagram for illustrating an example of changing a type of the vehicle exterior notification according to a duration.

DETAILED DESCRIPTION

Figure 1:
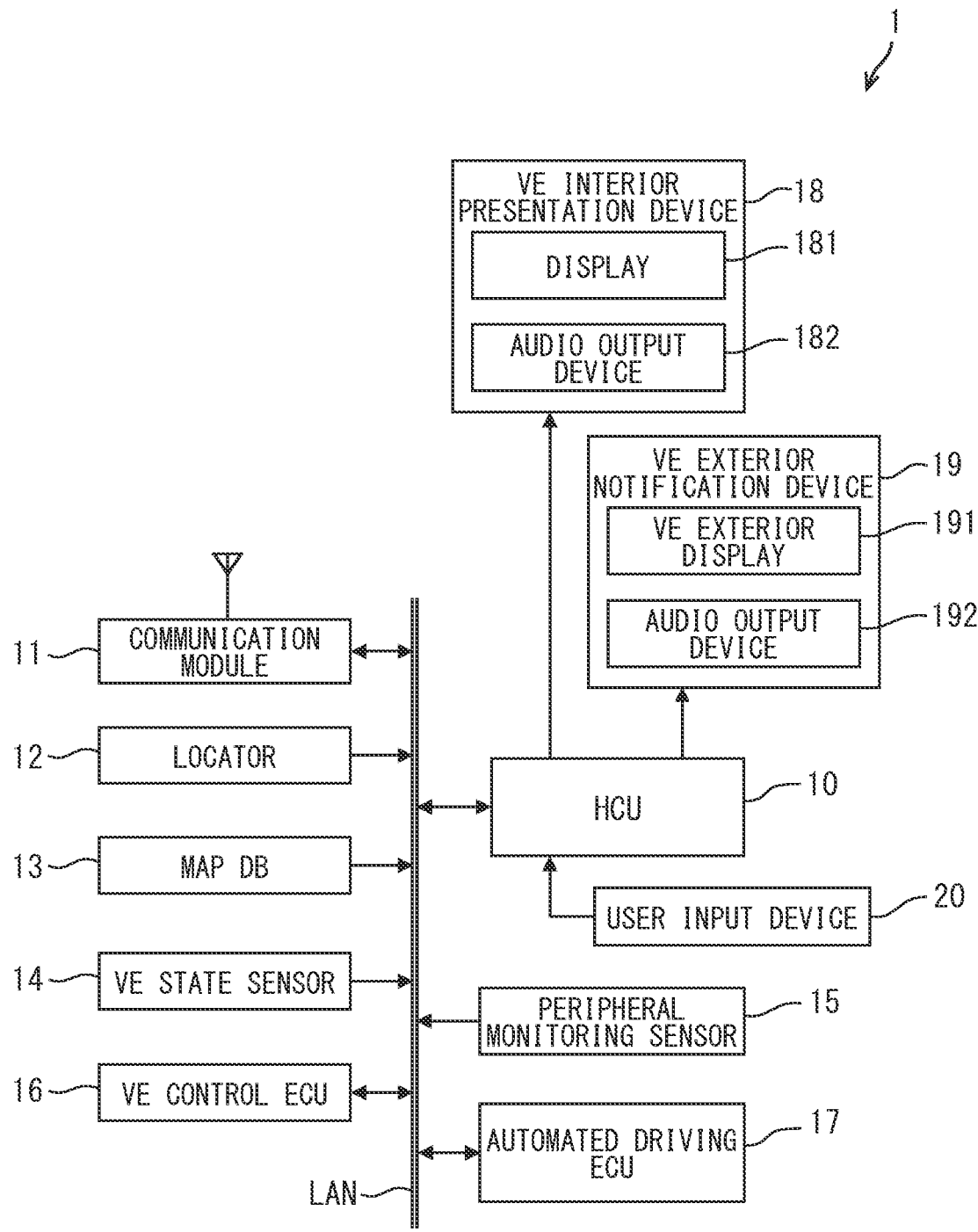
FIG. 1 is a diagram showing an example of a schematic configuration of a vehicle system.

In automated driving, a system control and driver behavior differ depending on an automation level. On the other hand, in the comparative example, only a notification indicating that the vehicle is "automatically driving" is provided to the outside of the vehicle while the subject vehicle is automatically driving. Therefore, according to the technology of the comparative example, even when the vehicle state regarding the automated driving changes, only one type of notification can be performed. It is difficult to provide notification showing different states regarding the automated driving of the subject vehicle to the periphery of the subject vehicle so that peripheral objects easily understand the states.

On example of the present disclosure provides a vehicle notification control device and a vehicle notification control method capable of providing notification to a periphery of a subject vehicle so that objects in a periphery of the subject vehicle easily understand different states regarding the automated driving of the subject vehicle when a vehicle performs the automated driving.

According to one example of the present disclosure, a vehicle notification control device is used for a vehicle capable of: performing automated driving at a plurality of automation levels; and switching the plurality of automation levels each indicating a degree of the automated driving. The vehicle notification control device includes: a state identification unit configured to identify an automated driving-related state that is a state of the vehicle, the state being related to the automated driving; and a vehicle exterior notification controller configured to control a vehicle exterior notification device that performs vehicle exterior notification that is notification of information related to the automated driving toward an outside of the vehicle. The vehicle exterior notification controller changes a type of the vehicle exterior notification according to the automated driving-related state identified by the state identification unit.

According to another example of the present disclosure, a vehicle notification control method is used for a vehicle capable of: performing automated driving at a plurality of automation levels; and switching the plurality of automation levels each indicating a degree of the automated driving. The vehicle notification control method causes at least one processor to: identify an automated driving-related state that is a state of the vehicle, the state being related to the automated driving; control a vehicle exterior notification device that performs vehicle exterior notification that is notification of information related to the automated driving toward an outside of the vehicle; and change a type of the vehicle exterior notification according to the identified automated driving-related state.

According to the examples, it is possible to change the type of vehicle exterior notification, which is the notification of information regarding the automated driving and provided to the outside of the vehicle, according to the vehicle state regarding the automated driving. Therefore, the different states of the automated driving of the subject vehicle can be easily understood by the periphery of the subject vehicle depending on the type of vehicle exterior notification. As the result, when the vehicle performs the automated driving, it is possible to notify objects in the periphery of the subject vehicle of the different states of the automated driving of the subject vehicle so that the objects easily understand the different states.

The following will describe embodiments of the present disclosure with reference to the accompanying drawings.

First Embodiment

<Schematic Configuration of Vehicle System>

The following will describe a first embodiment of the present disclosure with reference to the drawings. A vehicle system 1 shown in FIG. 1 can be used for a vehicle configured to perform automated driving (hereinafter referred to as an automated driving vehicle). In the drawings, the term of "vehicle" may be also referred to as "VE". As shown in FIG. 1, the vehicle system 1 includes an HCU (Human Machine Interface Control Unit) 10, a communication module 11, a locator 12, a map database (hereinafter referred to as map DB) 13, a vehicle state sensor 14, a periphery monitoring sensor 15, a vehicle control ECU 16, an automated driving ECU 17, a vehicle interior presentation device 18, a vehicle exterior notification device 19, and a user input device 20. For example, the HCU 10, the communication module 11, the locator 12, the map DB 13, the vehicle state sensor 14, the periphery monitoring sensor 15, the vehicle control ECU 16, and the automated driving ECU 17 are connected to a vehicle interior LAN (see LAN in FIG. 1). Although the vehicle using the vehicle system 1 is not necessarily limited to an automobile, hereinafter, an example using the automobile will be described.

The degree of the automated driving (hereinafter, referred to as an automation level) of an automated driving vehicle includes a plurality of levels as defined by, for example, SAE. This automation level is classified into, for example, five levels including LV 0 to LV 5 as follows.

The LV 0 is a level where the driver performs all driving tasks without any intervention of the system of the vehicle. The driving task may be rephrased as a dynamic driving task. The driving tasks include, for example, steering, acceleration and deceleration, and periphery monitoring. The LV 0 corresponds to so-called manual driving. The LV 1 is a level where the system assists steering or acceleration and deceleration. The LV 1 corresponds to so-called driving assistance. The LV 2 is a level where the system assists all of the steering, the acceleration, and the deceleration. The LV 2 corresponds to so-called partial driving automation. The LVs 1 and 2 are a part of the automated driving.

For example, the automated driving at LVs 1 and 2 is automated driving in which a driver has an obligation of monitoring related to safe driving (hereinafter simply referred to as a monitoring obligation). The monitoring obligation includes visual monitoring of the periphery. The automated driving at LVs 1 and 2 is, in other words, automated driving in which a second task is not permitted. The second task is an action other than a driving operation permitted to the driver, and is a predetermined specific action. The second task is, in other words, a secondary activity, the other activity, or the like. The second task must not prevent a driver from responding to a request to take over the driving operation from the automated driving system. As an example, viewing of a content such as a video, operation of a smartphone, reading, and eating are assumed as the second task.

The LV 3 of the automated driving is a level where the system performs all driving tasks under certain conditions, and the driver performs the driving operation in an emergency situation. In the LV 3 of the automated driving, the driver must be able to respond quickly when the system requests to take over the driving operation. This takeover of the driving can also be rephrased as transfer of the monitoring obligation from the system of the vehicle to the driver. The LV 3 corresponds to a conditional driving autonomation. The LV 3 includes an area limit LV 3 that is limited to a specific area. The specific area referred to here may be a motorway or expressway. The specific area may be, for example, a specific lane. The LV 3 includes a specific situation limit LV 3 limited to the specific peripheral situation. An example of the specific peripheral situation is traffic congestion. Hereinafter, as the specific situation limit LV 3, a traffic congestion limit LV 3 that is limited to the traffic congestion will be described as an example. The traffic congestion limit LV 3 may be limited to traffic congestion in, for example, the automobile road, and the expressway.

The LV 4 is a LV where the system is capable of performing all driving tasks, except under a specific circumstance, such as an unsupported road, an extreme environment, and the like. The LV 4 corresponds to a high driving automation. The LV 5 of the automated driving is a level in which the system is capable of performing all driving tasks in any situation. The LV 5 corresponds to a full driving automation.

For example, the automated driving at LVs 3 to 5 is an automated driving in which the driver does not have the monitoring obligation. In other words, the automated driving corresponds to automated driving without the monitoring obligation. The automated driving at LVs 3 to 5 is, in other words, automated driving in which the second task is permitted. Among the automated driving at LVs 3 to 5, the automated driving at LV 4 or higher is automated driving in which the driver is permitted to sleep (hereinafter referred to as sleep-permitted automated driving). Among the automated driving at LVs 3 to 5, the automated driving at LV 3 or higher is automated driving in which the driver is permitted to sleep (hereinafter referred to as sleep-unpermitted automated driving).

The automated driving vehicle of the present embodiment is capable of switching the automation level. A configuration may be employable in which the automation level is switchable within a part of the LVs 0 to 5. In the present embodiment, an example will be described in which an automated driving vehicle is capable of switching between the automated driving at the LV 3, the automated driving at the LV 2 or lower, or manual driving at the LV 0.

Further, in this embodiment, the automated driving at LV 2 may include a hands-on mode automated driving that requires gripping of the steering wheel of the subject vehicle and a hands-off mode automated driving that does not require gripping of the steering wheel of the subject vehicle. Even in a case of the automated driving at the same LVs 2, it is assumed that the hands-off mode has a higher degree of automation than the hands-on mode. In other words, even in the case of the same LVs 2, the automation level may be subdivided. For example, the LV 2 in the hands-on mode may be LV 2, and LV 2 in the hands-off mode may be LV 2.5.

The communication module 11 transmits and receives information to and from a center outside the subject vehicle via wireless communications. That is, wide area communication is performed. The communication module 11 receives traffic congestion information related to the periphery of the subject vehicle from the center via the wide area communication. The communication module 11 may transmit and receive information to and from other vehicles via the wireless communication. In other words, the communication module 11 may perform a vehicle-to-vehicle communication. The communication module 11 may transmit and receive information via the wireless communication with a roadside device installed on a roadside. In other words, the communication module 11 may perform a road-to-vehicle communication. When performing the road-to-vehicle communication, the communication module 11 may receive peripheral vehicle information transmitted from the vehicle positioned in the peripheral of the subject vehicle via the roadside device. Further, the communication module 11 may receive information about a peripheral vehicle transmitted from the vehicle positioned in the periphery of the subject vehicle via the center by the wide area communication.

The locator 12 includes a GNSS (Global Navigation Satellite System) receiver and an inertial sensor. The GNSS receiver receives positioning signals from multiple positioning satellites. The inertial sensor includes, for example, a gyro sensor and an acceleration sensor. The locator 12 combines the positioning signals received by the GNSS receiver with a measurement result of the inertial sensor to sequentially detect the position of the subject vehicle (hereinafter, subject vehicle position) on which the locator 12 is mounted. The subject vehicle position may be represented by, for example, coordinates of latitude and longitude. The subject vehicle position may be measured by using a travel distance acquired from signals sequentially output from a vehicle speed sensor mounted on the vehicle.

The map DB 13 is a non-volatile memory and stores the high-precision map data. The high-precision map data is map data with higher precision than the map data used for route guidance in a navigation function. The map DB 13 may also store map data used for route guidance. The high-precision map data includes information that can be used for the automated driving operation, such as three-dimensional road shape information, information on the number of lanes, and information indicating the direction of travel allowed for each lane. In addition, the high-precision map data may also include, for example, node point information indicating the positions of both ends of a road marking such as a lane marking. The locator 12 may be configured without the GNSS receiver by using the three-dimensional shape information of the road. For example, the locator 12 may be configured to identify the subject vehicle position by using the three-dimensional shape information of the road and a detection result of the periphery monitoring sensor 15 such as a LiDAR (Light Detection and Ranging/Laser Imaging Detection and Ranging) that detects feature points of the road shape and the structure or a periphery monitoring camera. The term of "identify" may also mean a term of "determine". The three-dimensional shape information of the road may be generated based on a captured image by REM (Road Experience Management).

The communication module 11 may receive map data distributed from an external server through, for example, wide area communications and may store the data in the map DB 13. In this case, the map DB 13 may be a volatile memory, and the communication module 11 may sequentially acquire the map data of an area corresponding to the subject vehicle position.

The vehicle state sensor 14 is a sensor group for detecting various states of the subject vehicle. The vehicle state sensor 14 includes a vehicle speed sensor for detecting a vehicle speed, a steering sensor for detecting a steering angle, and the like. The vehicle state sensor 14 includes a steering torque sensor, an accelerator sensor, a brake sensor, and the like. The steering torque sensor detects a steering torque applied to the steering wheel. The accelerator sensor detects whether the accelerator pedal is depressed. As the accelerator sensor, an accelerator depression force sensor that detects the depression force applied to the accelerator pedal may be used. As the accelerator sensor, an accelerator stroke sensor that detects the depression amount of the accelerator pedal may be used. As the accelerator sensor, an accelerator switch that outputs a signal corresponding to whether or not the accelerator pedal is depressed may be used. The brake sensor detects whether the brake pedal is depressed. As the brake sensor, a brake depressing force sensor that detects the depressing force applied to the brake pedal may be used. A brake stroke sensor that detects the amount of depression of the brake pedal may be used as the brake sensor. As the brake sensor, a brake switch that outputs a signal corresponding to whether the brake pedal is depressed may be used.

The vehicle state sensor 14 includes a grip sensor, an illuminance sensor, a direction indicator switch, and the like. The grip sensor detects gripping of the steering wheel. The illuminance sensor detects illuminance. The illuminance sensor is provided on the outer surface of the subject vehicle, and may detect the brightness (that is, illuminance) on the outer surface. In addition, the illuminance sensor may be provided, for example, on an upper surface of an instrument panel of the subject vehicle to detect the illuminance on a windshield. The direction indicator switch is a switch for detecting lighting operation of the turn lamp, which is a direction indicator. The direction indicator switch can also be called a turn signal switch or a blinker switch. The turn lamp can also be called a turn signal lamp or a blinker lamp. The vehicle state sensor 14 outputs detected sensing information to the vehicle interior LAN. Note that the sensing information detected by the vehicle state sensor 14 may be output to the vehicle interior LAN via an ECU mounted on the subject vehicle.

The periphery monitoring sensor 15 monitors a peripheral environment of the subject vehicle. For example, the periphery monitoring sensor 15 detects an obstacle around the subject vehicle, such as a pedestrian, a mobile object like the other vehicle, and a stationary object, and an object on the road. The periphery monitoring sensor 15 further detects a road surface marking such as a traffic lane marking around the subject vehicle. The periphery monitoring sensor 15 is, for example, a sensor such as a periphery monitoring camera that captures a predetermined range in the periphery of the subject vehicle, a millimeter wave radar that transmits a search wave in a predetermined range around the subject vehicle, a sonar, or a LiDAR. The periphery monitoring camera sequentially outputs, as sensing information, sequentially captured images to the automated driving ECU 17. A sensor that transmits a probe wave such as a sonar, a millimeter wave radar, a LiDAR or the like sequentially outputs, as the sensing information to the automated driving ECU 17, a scanning result based on a received signal acquired as a wave reflected on an obstacle on the road. The sensing information detected by the periphery monitoring sensor 15 may be outputted to the vehicle interior LAN via the automated driving ECU 17.

The vehicle control ECU 16 is an electronic control unit configured to perform a traveling control of the subject vehicle. The traveling control includes an acceleration and deceleration control and/or a steering control. The vehicle control ECU 16 includes a steering ECU that performs the steering control, a power unit control ECU and a brake ECU that perform the acceleration and deceleration control, and the like. The vehicle control ECU 16 is configured to output a control signal to a traveling control device such as an electronic throttle, a brake actuator, and an EPS (Electric Power Steering) motor mounted on the subject vehicle thereby to perform the traveling control.

The automated driving ECU 17 includes, for example, a processor, a memory, an I/O, and a bus that connects those devices, and executes a control program stored in the memory thereby to execute a process related to the autonomous driving operation. The memory referred to here is a non-transitory tangible storage medium, and stores programs and data that can be read by a computer. The non-transitory tangible storage medium may be provided by a semiconductor memory, a magnetic disk, or the like. The automated driving ECU 17 includes, as functional blocks, a traveling environment recognition unit, an action determination unit, and a control execution unit.

The traveling environment recognition unit recognizes a traveling environment around the subject vehicle based on the sensing information acquired from the periphery monitoring sensor 15. The traveling environment recognition unit recognizes the traveling environment in the periphery of the subject vehicle based on, in addition to the sensing information, which is acquired from the periphery monitoring sensor 15, the subject vehicle position, which is acquired from the locator 12, the map data, which is acquired from the map DB 13 and the like. As an example, the traveling environment recognition unit uses these pieces of information to generate a virtual space that reproduces an actual driving environment.

The traveling environment recognition unit may determine a manual driving area (hereinafter referred to as an MD area) in a travelling area of the subject vehicle. The traveling environment recognition unit may determine an automated driving area (hereinafter referred to as an AD area) in the travelling area of the subject vehicle. The traveling environment recognition unit may also discriminate between an ST section and a non-ST section, which will be described later, in the AD area.

The MD area is an area where the automated driving is prohibited. In other words, the MD area is an area where the driver performs all of the longitudinal control, the lateral control and the peripheral monitoring of the subject vehicle. The longitudinal direction is a direction that coincides with a front-rear direction of the subject vehicle. The lateral direction is a direction that coincides with a right-left direction of the subject vehicle. The longitudinal direction control corresponds to acceleration-deceleration control of the subject vehicle. The lateral direction control corresponds to steering control of the subject vehicle. For example, the MD area may be a general road.

The AD area is an area where the automated driving is permitted. In other words, the AD area is an area where a system in the subject vehicle is capable of performing at least one of the longitudinal control, the lateral control, or the periphery monitoring, instead of the driver. For example, the AD area may be a highway or a motorway. The automated driving at the traffic congestion limit LV 3 (hereinafter referred to as traffic congestion limit automated driving) may be configured, for example, to be permitted only during the traffic congestion in the AD area.

The AD area is divided into an ST section and a non-ST section. The ST section is a section in which the automated driving at the area limit LV 3 (hereinafter referred to as area limit automated driving) is permitted. The area limit automated driving may be configured to be permitted only in specific lanes in the ST section. The non-ST section is a section in which the automated driving at LV2 or lower is possible. In the present embodiment, it is assumed that the non-ST section, in which the automated driving at LV1 is permitted, and the non-ST section, in which the automated driving at LV2 is permitted, are not classified. The ST section may be, for example, a traveling section in which a high-precision map date is prepared. The non-ST section may be set to a section that does not correspond to the ST section in the AD area.

The behavior determination unit switches the control subject of driving operation control between the driver and the vehicle system of the subject vehicle. The behavior determination unit determines a traveling plan to travel the subject vehicle based on the recognition result of the traveling environment by the traveling environment recognition unit when the system has a right to control the driving operation. As the traveling plan, it is sufficient to determine the route to the destination and the behavior that the subject vehicle should take to reach the destination. Examples of the behavior include going straight, turning right, turning left, changing lanes, and the like. The control execution unit performs traveling control such as acceleration-deceleration control and steering control of the subject vehicle according to the traveling plan determined by the behavior determination unit in cooperation with the vehicle control ECU 16 when the system has the right to control the driving operation.

In addition, the behavior determination unit switches the automation level of automated driving of the subject vehicle as necessary. The behavior determination unit determines whether the automation level can be increased. For example, the switching from the manual driving to the automated driving at LV 2 or lower may be determined to be possible, when the subject vehicle moves from the MD area to the non-ST section in the AD area. The switching from the manual driving at LV 0 to the automated driving at the area limit LV 3 may be determined to be possible, when the subject vehicle moves from the MD area to the ST section in the AD area. When the subject vehicle moves from the non-ST section to the ST section in the AD area, it may be determined that the automated driving at LV 2 or lower can be switched to the automated driving at LV 3. When the subject vehicle is located in the AD area, the automation level is LV 2 or lower, and all the conditions for the traffic congestion limit LV 3 are satisfied, it may be determined that switching from the automated driving at LV 2 or lower to the traffic congestion limit LV 3 is possible.

The behavior determination unit may increase the automation level when it determines that the automation level can be increased and when the driver approves the increase in the automation level. The approval operation by the driver may be specified based on the approval received by the HCU 10 via the user input device 20. The approval includes pre-approval that is performed before it is determined that the automation level can be increased, and normal approval that is performed when it is determined that the automation level can be increased. The pre-approval may be performed by receiving setting inputs in advance through the user input device 20. The normal approval may be performed by receiving an input through the user input device 20, for example, when it is determined that the automation level can be raised and prior approval has not been given. The pre-approval may be enabled only when the automation level is increased to a predetermined level or higher. For example, it may be possible only when the automation level is LV 3 or higher.

The behavior determination unit may decrease the automation level when determining that the automation level needs to be decreased. Cases where it is determined that the automation level needs to be lowered include the time of override detection, the time of planned driving change, and the time of unplanned driving change. The override is an operation for the driver of the subject vehicle to voluntarily acquire the control right of the subject vehicle. In other words, the override is an operational intervention by the driver of the vehicle. The behavior determination unit may detect the override operation from sensing information obtained from the vehicle state sensor 14. For example, the behavior determination unit may detect the override operation when the steering torque detected by the steering torque sensor exceeds a threshold. Also, the behavior determination unit may detect the override operation when the accelerator sensor detects depression of the accelerator pedal. In addition, the behavior determination unit may detect the override operation when the brake sensor detects depression of the brake pedal.

A scheduled driving change is a scheduled driving change determined by the system. For example, the scheduled driver change is performed when the subject vehicle moves from the ST section of the AD area to the non-ST section or the MD area. In this case, the automation level drops from the area limit LV 3 to LV 2 or lower. The scheduled driver change may be performed when the subject vehicle moves from the non-ST section of the AD area to the MD area. In this case, the automation level drops from the area limit LV 3 to LV 0. The unscheduled driving change is an unscheduled sudden driving change determined by the system. For example, the unscheduled driver change is performed when the conditions of traffic congestion limit LV 3 are no longer satisfied during the automated driving of traffic congestion limit LV 3. In this case, the automation level drops from the traffic congestion limit LV 3 to LV 2 or lower. A plurality of types of conditions may be used as the conditions for the traffic congestion limit LV 3. Example of the conditions may be that the vehicle is within the AD area, that the vehicle speed of the preceding vehicle or the subject vehicle is equal to or less than a threshold for estimating the traffic congestion, and that the vehicle is in the traffic congestion section according to the traffic congestion information. The unscheduled driver change may be performed when the automation level cannot be maintained due to a failure in the recognition of the traveling environment by the traveling environment recognition unit.

When the automation level is lowered by the override, the automated driving ECU 17 lowers the automation level after an auxiliary period in which the system of the subject vehicle performs more driving assistance than the lowered automation level. The traveling assistance during the auxiliary period may be, for example, less than the automation level that is not lowered, but greater than the lowered automation level. Further, when the automation level is lowered due to the driving change determined by the system of the subject vehicle, the automated driving ECU 17 makes a driving change request to the driver of the subject vehicle and then lowers the automation level. The driver change request is presented to the driver by the vehicle interior presentation device 18, which will be described later. When receiving the driving change request, the driver takes a preparatory action necessary for lowering the automation level, such as gripping the steering wheel. The automated driving ECU 17 confirms that this preparatory action has been taken based on the sensing result of the grip sensor of the vehicle state sensor 14 and then lowers the automation level. When the preparatory action is not performed, measures such as evacuating to the road shoulder and stopping the vehicle may be taken.

The automated driving ECU 17 may be configured to selectively use the above-described hands-on mode automated driving and hands-off mode automated driving as the LV 2 automated driving. For example, when switching from the automation level LV 3 to the automation level LV 2 is scheduled based on a state that can be predicted in advance, the automated driving ECU 17 may perform the switching to the automated driving in the hands-off mode. On the other hand, when switching from the LV 3 to the LV 2 is unscheduled based on a state that cannot be predicted in advance, a configuration may be employable to switch to automated driving in the hands-on mode. When the switching from the LV 3 to the LV 2 is sudden, there is a high possibility that relatively intense vehicle behavior will occur. Thus, it is conceivable that there is a high need for the driver to grip the steering wheel. Note that automated driving at automation LV 1 corresponds to hands-on mode automated driving at LV 1.

The configuration is not limited to the above examples. The hands-on mode and the hands-off mode of the LV 2 automated driving may be selectively used depending on whether high-precision map data exists. For example, the hands-off mode may be set in sections for which high-precision map data exists. On the other hand, the hands-on mode may be set in sections for which the high-precision map data does not exist. Alternatively, the hands-on mode and the hands-off mode may be selectively used depending on whether the subject vehicle is approaching a specific point. For example, the hands-off mode may be selected when the subject vehicle is not approaching the specific point. The hands-on mode may be selected when the subject vehicle is approaching the specific point. Whether the subject vehicle is approaching the specific point may be determined based on whether the distance to the specific point is equal to or less than an arbitrary predetermined value. Examples of the specific point may include a toll booth in the specific road section described above, an exit in the specific road section described above, a merging point, an intersection, a two-way traffic section, a point where the number of lanes decreases, and the like. The specific point may also be rephrased as a point where it is estimated that there is a higher possibility that the driver will need to grip the steering wheel. Further, the automated driving ECU 17 may perform the switching to the hands-on mode even in the hands-off mode when the grip sensor, which will be described later, detects gripping of the steering wheel.

The vehicle interior presentation device 18 presents information to the interior of the subject vehicle. The vehicle interior presentation device 18 has a display 181 and an audio output device 182. The display 181 presents information by displaying information. The display 181 presents information according to instructions from the HCU 10. As the display 181, for example, a meter MID (Multi Information Display), CID (Center Information Display), HUD (Head-Up Display) can be used.

The meter MID is a display device provided in front of the driver's seat in the vehicle compartment. As an example, the meter MID may be arranged on the meter panel. The CID is a display device placed in a center of an instrument panel of the subject vehicle. The HUD is provided, for example, on an instrument panel inside the vehicle. The HUD projects a display image formed by an projector onto a predetermined projection area on a front windshield as a projection member. A light of the display image reflected by the front windshield to an inside of a vehicle compartment is perceived by the driver seated in the driver's seat. As a result, the driver can visually recognize a virtual image of the display image formed in front of the front windshield which is superimposed on a part of the foreground landscape. The HUD may be configured to project the display image onto a combiner provided in front of the driver's seat instead of the front windshield.

The audio output device 182 presents information by outputting audio. As the audio output device 182, a speaker or the like provided in the vehicle interior of the subject vehicle can be used.

The vehicle exterior notification device 19 provides vehicle exterior notification, which is information related to the automated driving, to the outside of the subject vehicle. The vehicle exterior notification device 19 has a vehicle exterior display 191 and an audio output device 192. The vehicle exterior display 191 is installed on the vehicle exterior of the subject vehicle and performs display toward the exterior of the subject vehicle. The vehicle exterior display 191 may perform display by light emission of a lamp, and the emission may not include display of text and images, for example. Hereinafter, a case where the vehicle exterior display 191 is the lamp will be described as an example. The vehicle exterior display 191 may be a display that shows a text, an image, and the like.

For example, an LED lamp may be used as the vehicle exterior display 191. It is preferable that the vehicle exterior display 191 is capable of changing various notification modes. The mode of notification corresponds to the mode using light emission when the notification is performed by the light emission. For example, it is preferable that the vehicle exterior display 191 is capable of switching lighting color in addition to switching between an on-state and an off-state of the lighting. The switching of the lighting color may be implemented by changing the lighting combination of the LEDs of a plurality of colors. It is preferable that the vehicle exterior display 191 is capable of blinking. It is preferable that the vehicle exterior display 191 is capable of changing a blinking cycle. It is preferable that the vehicle exterior display 191 is capable of changing a ratio between the on-state time and the off-state time of the light.

Figure 2:
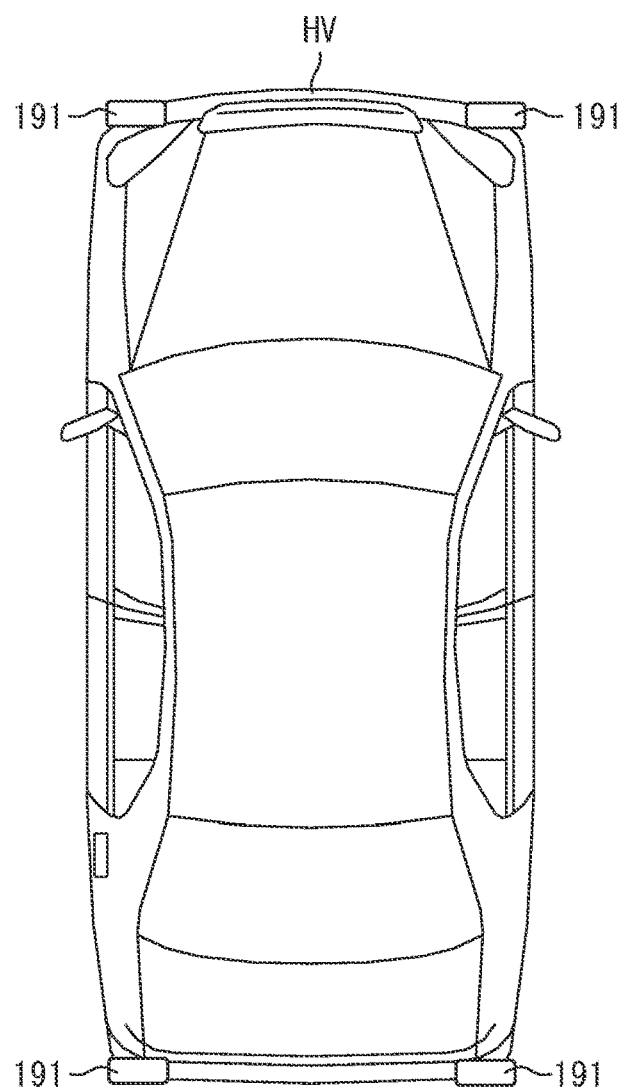
FIG. 2 is a diagram for illustrating an installation example of a vehicle exterior display.

As shown in FIG. 2, it is preferable that the LED lamps as the vehicle exterior displays 191 are provided at four corners of the subject vehicle. This is because the vehicle exterior displays 191 can be easily confirmed from any direction in the periphery of the subject vehicle. For example, the vehicle exterior displays 191 may be provided at the left and right corner portions of a front bumper and the left and right corner portions of a rear bumper, respectively. In FIG. 2, the HV indicates the subject vehicle.

Figure 3:
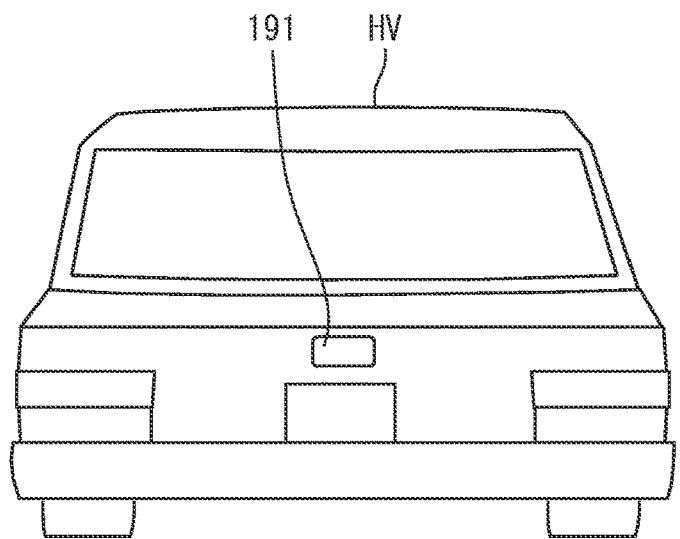
FIG. 3 is a diagram for illustrating an installation example of the vehicle exterior display.

As shown in FIG. 3, one LED lamp serving as the vehicle exterior display 191 may be provided in the vicinity of the central portion in the vehicle width direction of the rear portion of the vehicle. According to this, at least, the vehicle, which follows the subject vehicle and is most affected by the behavior of the subject vehicle, can easily check the vehicle exterior display 191.

The audio output device 192 presents information by outputting audio. As the audio output device 192, a speaker or the like provided on the vehicle exterior of the subject vehicle can be used.

The user input device 20 accepts input from the user. The user input device 20 may be an operation device that receives an operation input from the user. The operation device may be a mechanical switch or a touch switch integrated with the display 181. The user input device 20 is not limited to the operation device that accepts the operation input, as long as the user input device 20 is a device that accepts input from the user. For example, the user input device 20 may be an audio input device that receives command input by an audio such as a voice from the user.

The HCU 10 mainly includes a computer including a processor, a volatile memory, a nonvolatile memory, an I/O, and a bus connecting these devices. The HCU 10 is connected to the vehicle interior presentation device 18 and the vehicle exterior notification device 19. The HCU 10 executes processes related to control of the vehicle interior presentation device 18 and the vehicle exterior notification device 19 by executing a control program stored in the non-volatile memory. This HCU 10 corresponds to a vehicle notification control device. The configuration of the HCU 10 will be described in detail below. Execution of a process of each functional block of the HCU 10 by the computer corresponds to execution of a vehicle notification control method.

<Schematic Configuration of HCU>

Figure 4:
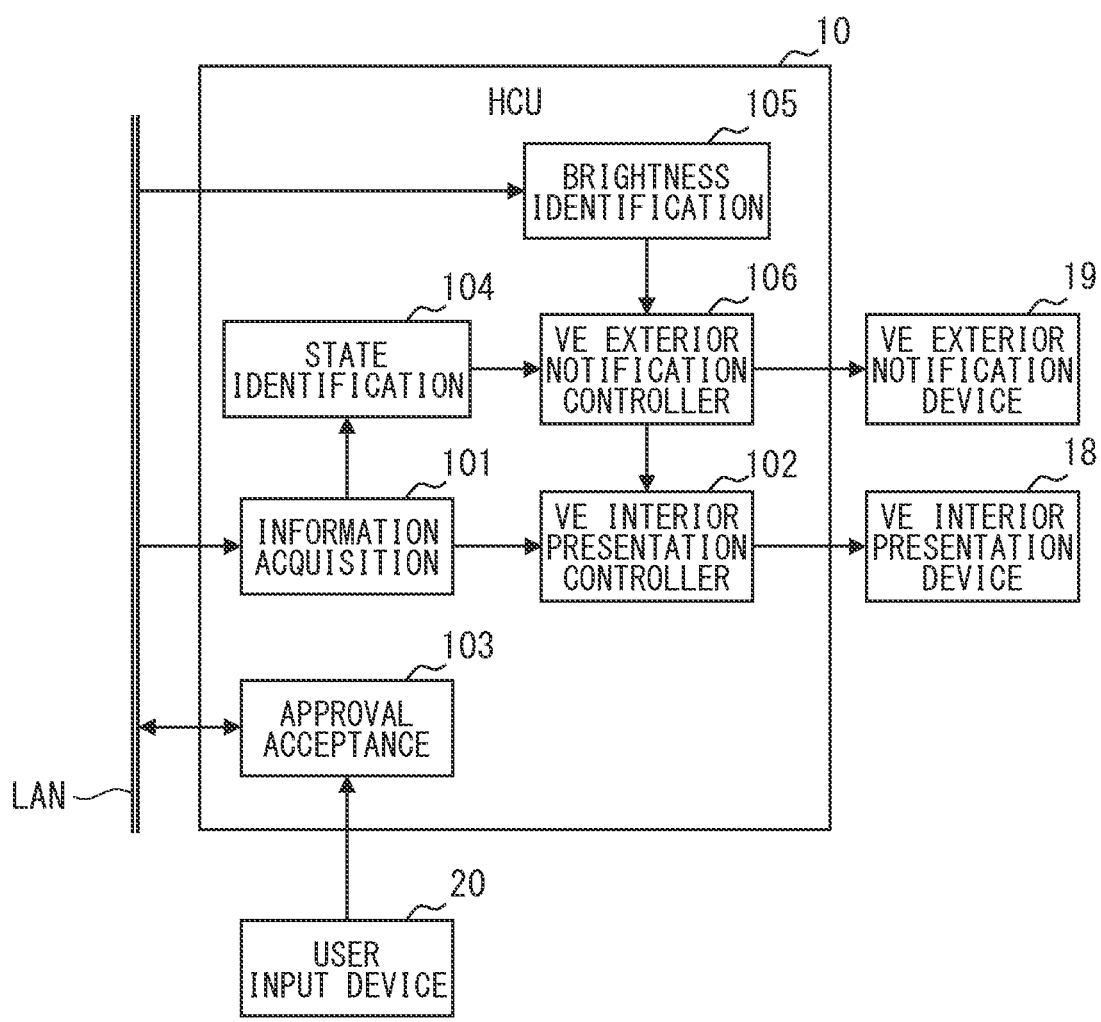
FIG. 4 is a diagram showing an example of a configuration of an HCU.

Next, a schematic configuration of the HCU 10 will be described with reference to FIG. 4. As shown in FIG. 4, the HCU 10 includes an information acquisition unit 101, a vehicle interior presentation controller 102, an approval acceptance unit 103, a state identification unit 104, a brightness identification unit 105, and a vehicle exterior notification controller 106 as functional blocks regarding the control of the vehicle interior presentation device 18 and the vehicle exterior notification device 19. Some or all of the functions executed by the HCU 10 may be implemented in hardware manner using one or more ICs or the like. Alternatively, some or all of the functions executed by the HCU 10 may be implemented by a combination of execution of software by a processor and a hardware device.

The information acquisition unit 101 acquires information input from the outside of the HCU 10. The information acquisition unit 101 acquires the recognition result of the traveling environment recognition unit of the automated driving ECU 17, for example. The information acquisition unit 101 acquires the determination result of the behavior determination unit of the automated driving ECU 17. The information acquisition unit 101 acquires sensing information detected by the vehicle state sensor 14.

The vehicle interior presentation controller 102 controls the vehicle interior presentation device 18. The vehicle interior presentation controller 102 causes the display 181 to display an image showing a foreground of the subject vehicle (hereinafter referred to as a foreground image). The vehicle interior presentation controller 102 may display the foreground image on the display 181 using the recognition result of the traveling environment recognition unit acquired by the information acquisition unit 101. For example, the foreground image may be a bird's-eye view viewed from a virtual viewpoint above the subject vehicle.

Figure 5:
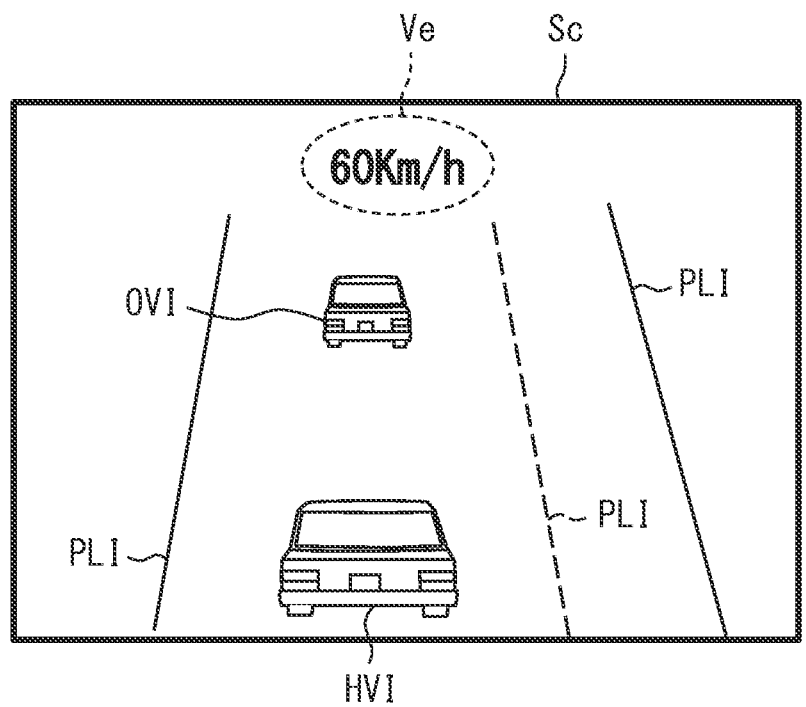
FIG. 5 is a diagram for illustrating an example of a foreground image displayed on a display.

An example of the foreground image will be described with reference to FIG. 5. Sc in FIG. 5 shows a display screen of the display 181. HVI in FIG. 5 shows an image representing the subject vehicle (hereinafter referred to as the subject vehicle image). OVI in FIG. 5 shows an image representing a peripheral vehicle of the subject vehicle (hereinafter referred to as a peripheral vehicle image). PLI in FIG. 5 shows an image representing a lane marking (hereinafter referred to as a lane marking image). VI in FIG. 5 shows an image representing a vehicle speed of the subject vehicle (hereinafter referred to as a subject vehicle speed image). As the foreground image, as shown in FIG. 5, a subject vehicle image, a peripheral vehicle image, the lane marking image, and a subject vehicle speed image may be displayed. In the foreground image, the subject vehicle image and the peripheral vehicle image that simulate an actual positional relationship between the subject vehicle and the peripheral vehicle may be displayed.

The approval acceptance unit 103 accepts approval for raising the automation level from the driver via the user input device 20. As described above, this approval includes the pre-approval and the normal approval. The pre-approval may be performed, for example, before the subject vehicle starts traveling. The pre-approval may be performed, for example, while the subject vehicle is traveling and before the automated driving at a specific automation level becomes possible. In an example, during the LV 2 automated driving, the pre-approval is performed at a predetermined distance before the ST section where the area limit automated driving is possible. The predetermined distance referred to here can be set arbitrarily, and may be, for example, 2 km. As for the pre-approval, it may be possible to approve only the increase between specific automation levels. As for the normal approval, when the automation level can be increased, for example, the vehicle interior presentation device 18 may inquire whether the approval is possible, and prompt the driver to input whether the approval is possible. Then, when the input indicating that the approval is possible is made, it may be determined that the normal approval has been accepted. When the approval is accepted, the approval acceptance unit 103 may notify the automated driving ECU 17 that the approval has been accepted. The automated driving ECU 17 increases the automation level based on acceptance of approval.

The state identification unit 104 identifies a state (hereinafter referred to as automated driving-related state) of the subject vehicle related to automated driving. The process of the state identification unit 104 corresponds to a state identification process. The state identification unit 104 may identify the automated driving-related state based on the information obtained by the information acquisition unit 101, such as the result of recognition by the traveling environment recognition unit and the result of determination by the action determination unit.

The state identification unit 104 may identify the current automation level as the automated driving-related state. The state identification unit 104 may identify the current automation level by monitoring the automated driving ECU 17. The state identification unit 104 may identify a change in the automation level as the automated driving-related state. The state identification unit 104 may identify the direction of the change in the automation level and the degree of the change in the automation level as the change in the automation level. As for the direction of change in the automation level, it is sufficient to specify whether the automation level will rise or fall. As the degree of the change in the automation level, the difference between the degree of automation before the change and the degree of automation after the change may be identified. The direction of the change in the automation level and the degree of the change in the automation level can be identified from the determination result of the behavior determination unit.

The state identification unit 104 may distinguish the automated driving with different permission conditions for the identification as the automated driving-related state. For example, the state identification unit 104 may at least distinguish between area limit automated driving and traffic congestion limit automated driving. When there are other types of automated driving with different permission conditions than the area limit automated driving and the traffic congestion limit automated driving, the automated driving may also be distinguished and identified. By monitoring the automated driving ECU 17, the state identification unit 104 may identify whether the area limit automated driving or the traffic congestion limit automated driving is in progress.

The state identification unit 104 may identify the duration as the automated driving-related state for the automated driving at an automation level with the predictable length (hereinafter, duration) of time or the predictable distance for enabling the continuation of the automated driving. For example, in the case of area limit automated driving, the distance from the vehicle position to the end point of the ST section or the remaining time to the end point may be identified as the duration. The remaining time from the vehicle position to the end point of the ST section can be calculated based on the distance from the vehicle position to the end point of the ST section and the vehicle speed. The vehicle speed here may be the average vehicle speed of the subject vehicle, the set vehicle speed for the area limit automated driving, or the like. For example, in the case of traffic congestion limit automated driving, the duration may be identified as the distance from the vehicle position to the end point of the traffic congestion section or the remaining time until the end point. The remaining time from the vehicle position to the end point of the traffic congestion section may be identified in the same manner as the remaining time from the vehicle position to the end point of the ST section. The traffic congestion section may be identified from the congestion information acquired via the communication module 11. The traffic congestion section may not be as clear as the ST section, so only in the case of area limit automated driving, the duration is identified.

The brightness identification unit 105 identifies the brightness in the periphery of the subject vehicle. In an example, the illuminance detected by the illuminance sensor in the vehicle state sensor 14 may be identified as the brightness in the periphery of the subject vehicle. The brightness identification unit 105 may identify the brightness of the image in the periphery of the vehicle captured by the periphery monitoring camera as the brightness in the periphery of the subject vehicle.

The vehicle exterior notification controller 106 controls the vehicle exterior notification device 19 to perform the vehicle exterior notification. The process by the vehicle exterior notification controller 106 corresponds to a vehicle exterior notification control process. The vehicle interior presentation controller 102 controls the vehicle interior presentation device 18 to perform a notification (hereinafter referred to as vehicle interior notification) toward the interior of the subject vehicle. The vehicle interior notification indicates that the vehicle exterior notification is being performed. Therefore, the vehicle interior presentation device 18 corresponds to a vehicle interior notification device, and the vehicle interior presentation controller 102 corresponds to a vehicle interior notification controller.

Figure 6:
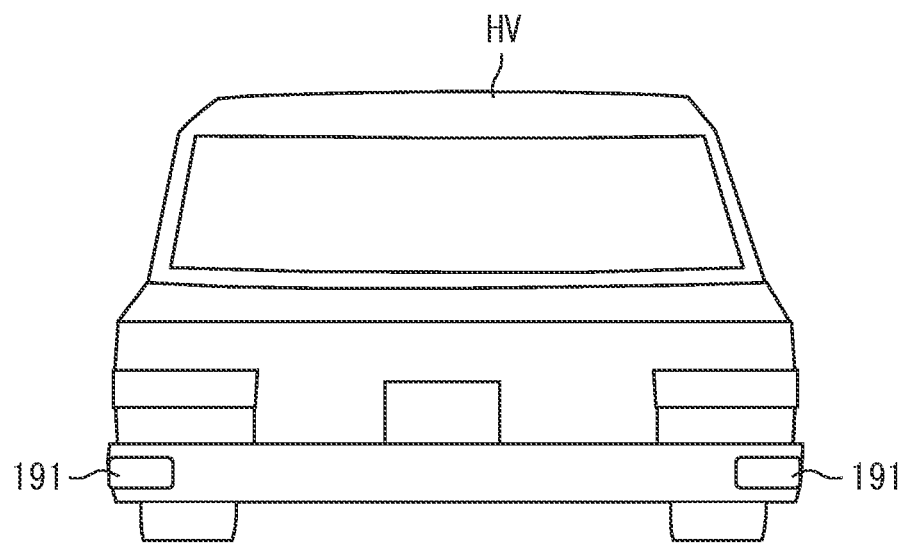
FIG. 6 is a diagram showing an example of an appearance of a subject vehicle.
Figure 7:
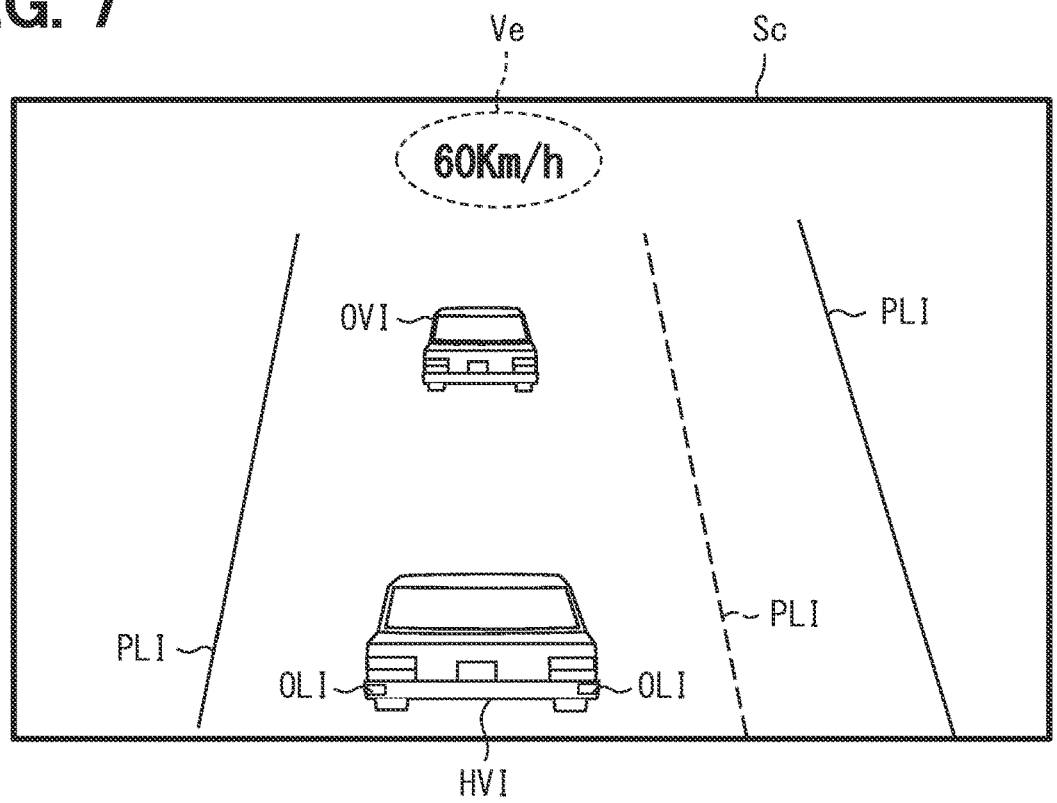
FIG. 7 is a diagram showing an example of vehicle interior notification in the foreground image.

As shown in FIG. 7, the vehicle interior presentation controller 102 can perform the vehicle interior notification by displaying, in the subject vehicle image displayed by the display 181, the similar information as the vehicle exterior notification in an area (see FIG. 6) where the vehicle exterior notification is performed using the vehicle exterior display 191. FIG. 6 is a diagram showing an appearance of the actual subject vehicle. FIG. 7 is a diagram showing an example of the vehicle interior notification in the foreground image described with reference to FIG. 5. FIG. 6 shows the appearance of the subject vehicle when viewed from behind. FIG. 6 shows an example in which the vehicle exterior displays 191 are provided at the four corner portions of the subject vehicle. The example of FIG. 6 shows the vehicle exterior displays 191 provided at the left and right corners of the rear part of the subject vehicle. OLI in FIG. 7 indicates an image (hereinafter referred to as an vehicle exterior notification lamp image) showing the vehicle exterior display 191 in the subject vehicle image.

Figure 8:
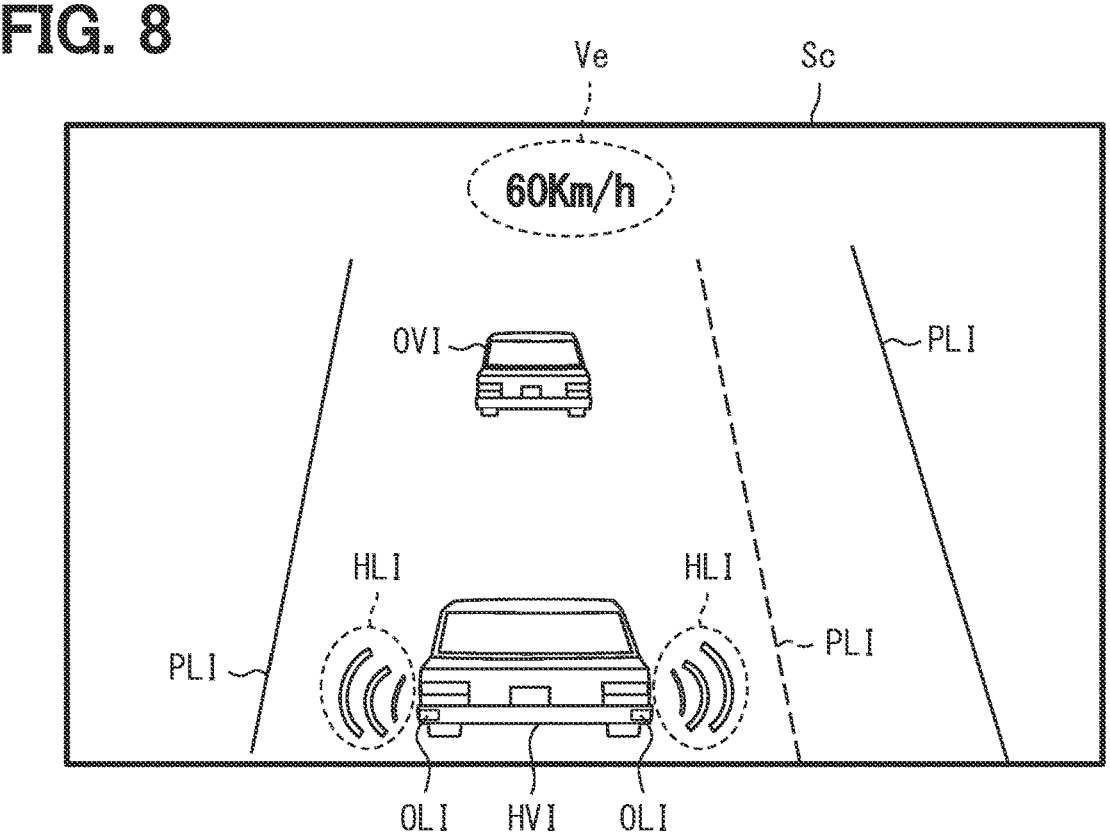
FIG. 8 is a diagram showing an example of the vehicle interior notification in the foreground image.

When the vehicle interior notification indicating that the vehicle exterior notification is being performed is provided using the subject vehicle image, as shown in FIG. 8, an image (see HLI in FIG. 8) that emphasizes the vehicle exterior notification lamp image may be displayed in the periphery of the subject vehicle image. According to this, even when it is difficult for the driver to understand that the vehicle exterior notification is being performed only with the vehicle exterior notification lamp image, it becomes easy for the driver to understand that the vehicle exterior notification is being performed.

The vehicle interior presentation controller 102 may cause the vehicle interior notification in cooperation with the vehicle exterior notification controller 106 performing the vehicle exterior notification. For example, the vehicle interior presentation controller 102 may cause the vehicle interior notification at the same timing when the vehicle exterior notification controller 106 performs the vehicle exterior notification. In an example of a case where an LED lamp is used as the vehicle exterior display 191, the vehicle exterior notification lamp image in the foreground image may be turned on at the same timing as the lighting of the LED lamp. For example, the vehicle exterior notification indicating that the automation level has changed and the vehicle interior notification indicating that the automation level has changed may be performed at the same timing. According to this, it becomes possible for the driver to know the timing at which the vehicle exterior notification is performed.

Further, the vehicle interior presentation controller 102 may cause the vehicle interior notification at an earlier timing than the vehicle exterior notification controller 106 causes the vehicle exterior notification. In an example of using an LED lamp as the vehicle exterior display 191, the vehicle exterior notification lamp image in the foreground image may be turned on at a timing earlier than the lighting of the LED lamp. For example, the vehicle interior notification indicating that the automation level has changed may be performed at an earlier timing than the vehicle exterior notification indicating that the automation level has changed. According to this, it becomes possible for the driver to know that the vehicle exterior notification will be performed earlier than the timing at which the vehicle exterior notification is performed. Hereinafter, an example is described in which the vehicle exterior notification indicating that the automation level has changed and the vehicle interior notification indicating that the automation level has changed are performed at the same timing.

Here, an example in which the vehicle interior notification is performed in the foreground image has been shown. However, the present disclosure is not limited to this. For example, in the case of using the subject vehicle simulation image, when the vehicle exterior notification is performed in the image area, a display similar to the vehicle exterior notification is performed in the area, the foreground image may not be used. Further, the configuration is not limited to the one in which the vehicle interior notification is performed by an image. For example, the vehicle interior notification may be performed by a meter lamp or indicator. In this case, the lamps and indicators of the meter may be light up in conjunction with the execution of the vehicle exterior notification. In addition, here, the example in which the vehicle interior notification may be performed in the display manner has been described. However, the present disclosure is not limited to the example. For example, the vehicle interior notification by audio may be similarly performed in conjunction with the execution of the vehicle exterior notification.

The vehicle exterior notification controller 106 changes the type of vehicle exterior notification according to the automated driving-related state identified by the state identification unit 104. When the vehicle exterior notification controller 106 performs the vehicle exterior notification by display, the vehicle exterior notification controller 106 may change the type of the vehicle exterior notification by changing the content of the text and image used for the display. When the vehicle exterior notification is performed by light emission, the vehicle exterior notification controller 106 may change the type of vehicle exterior notification by changing the lighting mode of the lamp. Examples of the difference in the light emission mode of the lamp include the difference between lighting, extinguishing, and blinking, the difference in the lighting color, the difference in the light and shade of the lighting color, the difference in the blinking cycle, and the difference in the ratio between the lighting time and the extinguishing time. When the vehicle exterior notification is performed by the light emission, it is easy to convey the contents even with the noise. Further, when the vehicle exterior notification is performed by light emission, it is possible to simplify the device compared to when it is performed by display. Hereinafter, the description will be continued taking as an example in which the vehicle exterior notification is performed by light emission of the lamp instead of text and image display.

It is preferable that the vehicle exterior notification controller 106 changes the type of vehicle exterior notification according to the automation level of the subject vehicle using the automated driving-related state identified by the state identification unit 104. In this case, the identification result of the current automation level may be used as the automated driving-related state. By changing the type of vehicle exterior notification according to the automation level of the subject vehicle, it is possible to provide the notification indicating the difference in the automation level of the subject vehicle so that the difference is more easily understood in the periphery of the subject vehicle.

In the following, an example of changing the type of vehicle exterior notification according to the automation level of the subject vehicle will be described. It is preferable that the vehicle exterior notification controller 106 changes the type of vehicle exterior notification depending on whether the automation level is an automation level corresponding to automated driving with a monitoring obligation or an automation level corresponding to automated driving without the monitoring obligation. The automation level corresponding to the automated driving with the monitoring obligation is LV 3 or higher. The automation level corresponding to the automated driving without the monitoring obligation is LV 1 to LV 2. According to this, it is possible to provide the notification of whether the currently performed automated driving of the subject vehicle requires the monitoring obligation in order to provide the easy understanding for the periphery of the subject vehicle. As a result, it becomes easier for those in the periphery of the subject vehicle to respond according to whether the vehicle is being driven automatically with or without the monitoring obligation. For example, when a target person is likely to concern the automated driving system, it becomes possible to secure a greater distance during the automated driving without monitoring obligation than during the automated driving with the monitoring obligation. On the other hand, when a target person is likely to concern driving operation of a driver, it becomes possible to secure a greater distance during the automated driving with the monitoring obligation than during the automated driving without the monitoring obligation.

Further, it is preferable that the vehicle exterior notification controller 106 changes the type of vehicle exterior notification depending on whether the automation level is LV 2 or lower in the hands-on mode or LV 2 in the hands-off mode. According to this, whether the automation level of the subject vehicle is LV 2 or lower in the hands-on mode or LV 2 in the hands-off mode can be notified to the periphery of the subject vehicle in the easy-to-understand manner. As a result, it becomes easier for the periphery of the subject vehicle to respond according to whether the subject vehicle is LV 2 or lower in the hands-on mode or LV 2 in the hands-off mode. For example, when the target person is likely to concern the automated driving system and the automation level is LV 2 in hands-off mode, it is possible to secure a greater distance than in the case of LV 2 or lower in hands-on mode. On the other hand, when the target person is likely to concern the driving operation of the driver and the automation level is LV 2 or lower in hands-on mode, it is possible to secure a greater distance than in the case of LV 2 in hands-off mode.

Here, with reference to FIG. 9, an example of the vehicle exterior notification when the type of vehicle exterior notification is changed according to the automation level of the subject vehicle will be described. FIG. 9 shows examples of three automation levels. The automation levels include LV 3, LV 2 in hands-off mode (hereinafter referred to as hands-off LV 2), and LV 2 in hands-on mode (hereinafter referred to as hands-on LV 2). It is assumed that the automation level decreases in the order of LV 3, hands-off LV 2, and hands-on LV 2. The hands-on LV 2 or lower may be hands-on LV 2, or may be LV 1 or LV 0. In the example of FIG. 9, the hands-on LV 2 or lower excludes LV 0. In other words, the automation level corresponds to the automated driving at LV 2 or lower in the hands-on mode.

As shown in FIG. 9, when the automation level of the subject vehicle is LV 3, the vehicle exterior notification controller 106 may turn on the lamp. As shown in FIG. 9, the vehicle exterior notification controller 106 may blink the lamp when the automation level of the subject vehicle is equal to or lower than the hands-off LV 2 and the hands-on LV 2. As a result, it becomes possible to notify the periphery of the subject vehicle in an easy-to-understand manner whether the subject vehicle is driving automatically with or without the monitoring obligation. As shown in FIG. 9, the vehicle exterior notification controller 106 may shorten the lighting time for blinking when the automation level of the subject vehicle is the hands-on LV 2 or lower than when the automation level is the hands-off LV 2. Thereby, whether the automation level of the vehicle is LV 2 or lower in the hands-on mode or LV 2 in the hands-off mode can be notified to the periphery of the subject vehicle in the easy-to-understand manner. For example, when the automation level of the subject vehicle is LV 0, the lamp should be turned off.

The LV 3 in FIG. 9 may be replaced with the higher level. FIG. 9 shows the configuration in which the lighting and blinking of the lamp are switched according to the automation level, or the ratio between the turn-on time and the turn-off time is changed. However, the present disclosure is not limited to the configuration. For example, the type of vehicle exterior notification may be changed by switching the lighting color according to the automation level. For example, depending on the automation level, the hue of the lighting color may be switched, or the shade of the color may be switched. The switching of the color shade may be implemented by varying the brightness of the lamp. When the automation level of the subject vehicle is an automation level that corresponds to the automated driving with the monitoring obligation, the lamp is turned on. On the other hand, in the case of the automation level corresponding to the automated driving without the monitoring obligation, the lamp may be turned off. The lamp may be turned off when the automation level of the subject vehicle is the automation level corresponding to automated driving with the monitoring obligation. On the other hand, in the case of the automation level corresponding to the automated driving without the monitoring obligation, the lamp may be turned on.

It is preferable that the vehicle exterior notification controller 106 changes the type of vehicle exterior notification for automated driving with different permission conditions based on the automated driving-related state identified by the state identification unit 104. For example, it is preferable that the vehicle exterior notification controller 106 uses the automated driving-related state identified by the state identification unit 104 to change the type of vehicle exterior notification between the area limit automated driving and the traffic congestion limit automated driving. In this case, as the automated driving-related state, a result of distinguishing and identifying the automated driving with different permission conditions may be used. By changing the type of vehicle exterior notification for automated driving with the different permission conditions, it is possible to provide notification for the easier understanding about the difference in the automated driving with different permission conditions for the subject vehicle.

Hereinafter, an example of changing the type of vehicle exterior notification during area limit automated driving and during traffic congestion limit automated driving will be described. In a case where the prior approval has been given, when the subject vehicle enters the ST section from outside the ST section, it is preferable that the vehicle exterior notification controller 106 performs the vehicle exterior notification indicating the possibility of starting the automated driving without the monitoring obligation before the subject vehicle enters the ST section. Since the area limit automated driving is possible within the ST section, when the prior approval is given, it is possible to accurately predict a timing when the automation level increases. Therefore, it is possible to notify the periphery of the subject vehicle of the possibility of starting automated driving without the monitoring obligation before it becomes possible to increase to the area limit LV 3. As a result, it becomes possible to notify the periphery of the subject vehicle that the automation level will rise as early as possible, if possible, to know that the automation level will rise.

Here, with reference to FIG. 10, an example of changing the type of vehicle exterior notification during area limit automated driving and during traffic congestion limit automated driving will be described. As shown in FIG. 10, the vehicle exterior notification controller 106 may blink the lamp when the automation level of the subject vehicle is limited to the traffic congestion limit LV 3 (that is, during the traffic congestion limit automated driving). On the other hand, the vehicle exterior notification controller 106 may turn on the lamp when the automation level of the subject vehicle is limited to the area limit LV 3 (that is, during the area limit automated driving). The end timing of traffic congestion limit automated driving is more difficult to be predicted that than the area limit automated driving. Therefore, it is easy for people to intuitively associate the blinking and lighting of the lamp with the traffic congestion limit automated driving and the area limit automated driving, respectively. Therefore, according to the above configuration, it becomes easier for those in the periphery of the subject vehicle to intuitively understand whether the subject vehicle is in the area limit automated driving or the traffic congestion limit automated driving.

FIG. 10 shows a configuration in which lighting and blinking of the lamp are switched between the area limit automated driving and the traffic congestion limit automated driving. However, the present disclosure is not limited to this. For example, the lighting color may be switched between the area limit automated driving and the traffic congestion limit automated driving. For example, the hue of the lighting color or the color depth may be switched between the area limit automated driving and the traffic congestion limit automated driving. In addition, the blinking cycle may be switched between the area limit automated driving and the traffic congestion limit automated driving, or the ratio of lighting time and light-off time may be switched.

When combining a configuration that changes the type of vehicle exterior notification according to the automation level of the subject vehicle and a configuration that changes the type of vehicle exterior notification depending on whether the area limit automated driving or the traffic congestion limit automated driving is in progress, for example, the following configuration may be employed. While changing the lighting color according to the automation level of the subject vehicle, the lamp may be turned on during the area limit automated driving, and the lamp may be turned off during the traffic congestion limit automated driving. According to this, the difference in the automation level of the subject vehicle and the difference between the area limit automated driving and the traffic congestion limit automated driving can be notified to the periphery of the subject vehicle in an easy-to-understand manner while the vehicle exterior notification is performed by light emission.

It is preferable that the vehicle exterior notification controller 106 changes the type of vehicle exterior notification according to the automated driving duration using the automated driving-related state identified by the state identification unit 104, when the automation level has the predictable duration. In this case, the identification result of the duration may be used as the automated driving-related state. By changing the type of vehicle exterior notification according to the duration, it is possible to provide, to the periphery of the subject vehicle, the more easily understood notification indicating the duration of the automated driving at the current automation level. The automation level that requires a predictable duration may be the area limit LV 3 or the traffic congestion limit LV 3. In the present embodiment, a case where the automation level with the predictable duration is the area limit LV 3 will be described as an example. The automation level that requires a predictable duration may be also referred to as a predictable automation level.

Here, with reference to FIG. 11, an example of changing the type of the vehicle exterior notification according to the duration will be described. In FIG. 11, a case where the remaining time (hereinafter, duration) from the current vehicle position to the end point of the ST section will be described as an example. As shown in FIG. 11, the vehicle exterior notification controller 106 may turn on the lamp when the duration of the area limit automated driving of the subject vehicle is 10 minutes or more. On the other hand, the vehicle exterior notification controller 106 may blink the lamp when the duration of the area limit automated driving of the subject vehicle is less than 10 minutes. It is easy for people to intuitively associate the shortening of the duration with the blinking of the lamp. Therefore, according to the above configuration, it becomes easier for the periphery of the subject vehicle to intuitively understand how long the area limit automated driving will continue.

FIG. 11 shows a configuration in which lighting and blinking of the lamp are switched depending on whether the duration is equal to or greater than the threshold value. However, the present disclosure is not necessarily to the configuration. For example, the blinking cycle may be shortened as the duration is shortened. Further, the lighting time in blinking may be shortened as the duration is shortened. In addition, a configuration may be adopted in which the lighting color becomes lighter as the duration becomes shorter. In any mode of light emission, it becomes easier for the periphery of the subject vehicle to intuitively understand that the duration length has become shorter.

When combining a configuration that changes the type of vehicle exterior notification according to the automation level of the subject vehicle, a configuration that changes the type of vehicle exterior notification depending on whether the area limit automated driving or the traffic congestion limit automated driving is in progress, and a configuration that changes the type of the vehicle exterior notification according to the duration, for example, the following configuration may be employed. While changing the hue of the lighting color according to the automation level of the subject vehicle, the lamp may be turned on during the area limit automated driving, and the lamp may be turned off during the traffic congestion limit automated driving. Also, the lighting color may be made lighter as the duration becomes shorter. In addition, the hue of the lighting color may be changed according to the automation level of the subject vehicle, and the hue of the lighting may also be changed during the area limit automated driving or the traffic congestion limit automated driving. In this case, the lighting color may be made lighter or the blinking cycle may be shortened as the duration becomes shorter. According to this, the difference in the automation level of the subject vehicle, the difference between the area limit automated driving and the traffic congestion limit automated driving, and the difference of the duration can be notified to the periphery of the subject vehicle in an easy-to-understand manner while the vehicle exterior notification is performed by light emission.

It is preferable that the vehicle exterior notification controller 106 changes the type of vehicle exterior notification according to the degree of the change in the automation level of the subject vehicle using the automated driving-related state identified by the state identification unit 104. In this case, the identification result of the degree of change in the current automation level may be used as the automated driving-related state. By changing the type of vehicle exterior notification according to the degree of the change in the automation level of the subject vehicle, it is possible to provide the notification indicating the difference in the change in the automation level of the subject vehicle so that the difference is more easily understood in the periphery of the subject vehicle. The vehicle exterior notification according to the degree of the change in the automation level of the subject vehicle is performed by changing the mode of a prior notification, which is a notification for providing the announcement that the automation level will change in advance, according to the degree of the change in the automation level of the subject vehicle. This prior notification may be configured to continue until the vehicle exterior notification about the changed automation level is started.

Figures 12, 13:
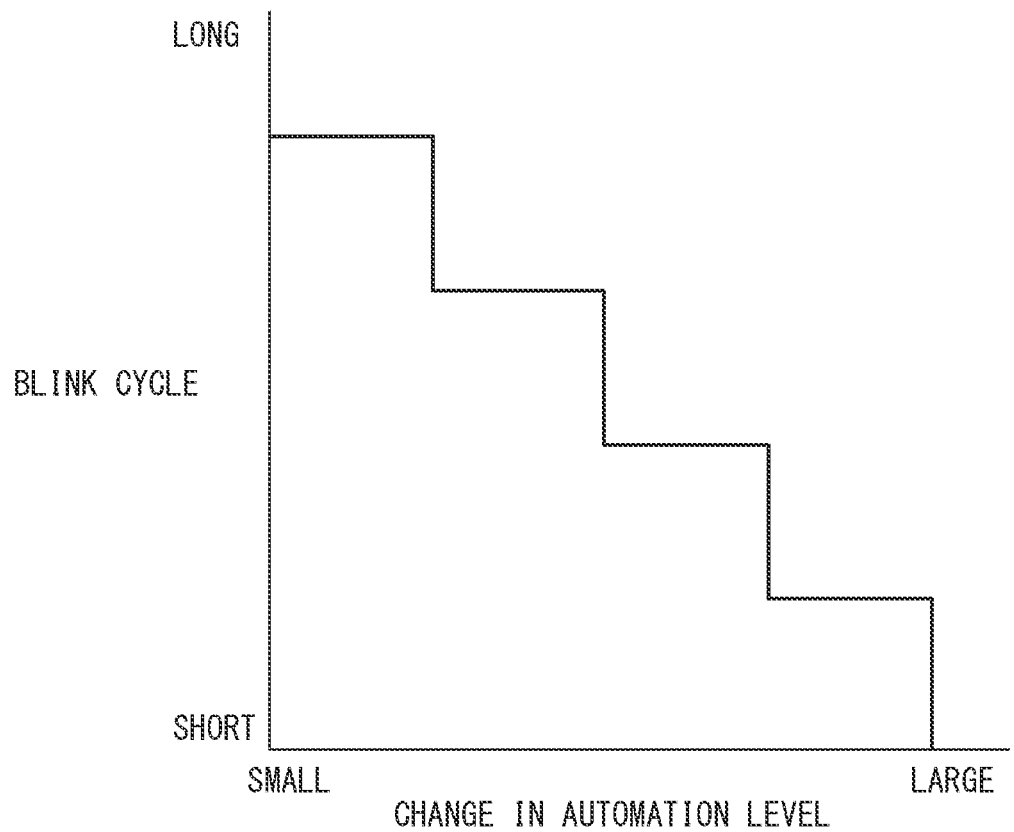
FIG. 12 is a diagram for illustrating an example of changing a type of the vehicle exterior notification according to a degree of change in the automation level.
FIG. 13 is a diagram for illustrating an example of changing the type of vehicle exterior notification according to whether the automation level increases or decreases.

Here, with reference to FIG. 12, an example of changing the type of the vehicle exterior notification according to the degree of change in the automation level will be described. A vertical axis of a graph in FIG. 12 indicates the blinking cycle of the lamp. A horizontal axis of the graph in FIG. 12 indicates the degree of change in the automation level. FIG. 12 shows an example in which there are four stages that can be taken as the degree of change in the automation level. In the example of FIG. 12, the possible automation levels are LV 0, LV 1, hands-on LV 2, hands-off LV 2, and LV 3 in descending order. For example, in a case of transition from LV 0 to LV 3, the degree of change in the automation level is four stages. In a case of transition from LV 3 to LV 1, the degree of the automation level change is three stages. In a case of transition from hands-off LV 2 to hands-on LV2, the degree of change in the automation level is one stage As shown in FIG. 12, the vehicle exterior notification controller 106 may shorten the cycle of blinking of the lamps as the automation level of the subject vehicle increases.

Although FIG. 12 shows an example in which there are four stages that can be taken as the degree of change in the automation level, FIG. 12 is one of the examples. The number of stages of the degree of change in the automation level may be different from four stages. Alternatively, when the degree of change in the automation level of the subject vehicle is equal to or greater than a threshold, the blinking cycle of the lamp may be made shorter than when the degree is less than the threshold. For example, when the degree of change in the automation level is two or more stages, the blinking cycle of the lamp may be made shorter than in the case of less than two stages.

Although FIG. 12 shows a configuration in which the blinking cycle of the lamp is switched according to the degree of change in the automation level of the subject vehicle, the present disclosure is not necessarily the configuration. For example, the depth of the lighting color may be switched according to the degree of change in the automation level of the subject vehicle. In addition, the blinking cycle may be switched between the area limit automated driving and the traffic congestion limit automated driving, or the ratio of lighting time and light-off time may be switched.

When combining configurations that change the type of vehicle exterior notification according to the automation level of the subject vehicle, a configuration that changes the type of vehicle exterior notification depending on whether the area limit automated driving or the traffic congestion limit automated driving is in progress, the configuration that changes the type of the vehicle exterior notification according to the duration, and a configuration that changes the type of the vehicle exterior notification according to the degree of the change in the automation level, for example, the following configuration may be employed. The hue of the lighting color may be changed according to the automation level of the subject vehicle, and the hue of the lighting color may also be changed depending on whether the vehicle is during the area limit automated driving or the traffic congestion limit automated driving. Also, the lighting color may be made lighter as the duration becomes shorter. Then, the blinking cycle may be shortened according to the degree of the change in the automation level. According to this, the difference in the automation level of the subject vehicle, the difference between the area limit automated driving and the traffic congestion limit automated driving, the difference of the duration, and the difference of the degree of the change in the automation level can be notified to the periphery of the subject vehicle in the easy-to-understand manner while the vehicle exterior notification is performed by light emission.

It is preferable that the vehicle exterior notification controller 106 changes the type of vehicle exterior notification according to whether the automation level of the subject vehicle increases or decreases based on the automated driving-related state identified by the state identification unit 104. In this case, the identification result of the direction of change in the current automation level may be used as the automated driving-related state. By changing the type of vehicle exterior notification according to whether the automation level of the subject vehicle increases or decreases, it is possible to provide the notification indicating whether the automation level of the subject vehicle increases or the decreases so that the notification is more easily understood in the periphery of the subject vehicle. The vehicle exterior notification according to whether the automation level of the subject vehicle increases or decreases is performed by changing the mode of a prior notification, which is a notification for providing the announcement that the automation level will increase or decrease in advance, according to the degree of the change in the automation level of the subject vehicle. This prior notification may be configured to continue until the vehicle exterior notification about the changed automation level is started.

Here, with reference to FIG. 13, an example of changing the type of vehicle exterior notification according to whether the automation level increases or decreases will be described. As shown in FIG. 13, the vehicle exterior notification controller 106 may fade in the lighting of the lamp when the automation level of the subject vehicle increases. As an example, the brightness of the lamp may be gradually increased. As shown in FIG. 13, the vehicle exterior notification controller 106 may fade out the lighting of the lamp when the automation level of the subject vehicle is lowered. As an example, the brightness of the lamp may be gradually lowered. It is easy for people to intuitively associate the increase in the automation level with the fade-in of lighting of the lamp. It is easy for people to intuitively associate the decrease in the automation level with the fade-out of lighting of the lamp. Therefore, according to the above configuration, it becomes easier for the people in the periphery of the subject vehicle to intuitively understand whether the automation level increases or decreases.

FIG. 13 shows a configuration in which the lighting of the lamp is faded in when the automation level of the subject vehicle increases, and the lighting of the lamp is faded out when the automation level decreases. However, the present disclosure is not limited to the configuration. For example, when the automation level of the subject vehicle increases, the lighting of the lamps may be faded out, and when the automation level of the subject vehicle decreases, the lighting of the lamps may be faded in. In addition, the cycle of blinking may be switched or the ratio between the lighting time and the time is switched depending on whether the automation level of the subject vehicle increases or decreases.

When the vehicle exterior notification controller 106 causes the vehicle exterior notification to be performed by blinking light, it is preferable that the vehicle exterior notification be blinked at a cycle different from the blinking cycle of the turn lamp of the subject vehicle. According to this, it becomes difficult for people in the periphery of the subject vehicle to erroneously recognize the blink of the vehicle exterior notification as the blinking of the turn lamp. The vehicle exterior notification controller 106 may use the timing at which the turn signal switch of the vehicle state sensor 14 detects the lighting operation and the information on the blinking cycle of the turn lamp to blink a cycle different from the blinking of the turn lamp of the subject vehicle. The information on the blinking cycle of the turn lamp may be obtained by reading the information stored in advance in the non-volatile memory of the HCU 10.

Figure 14:
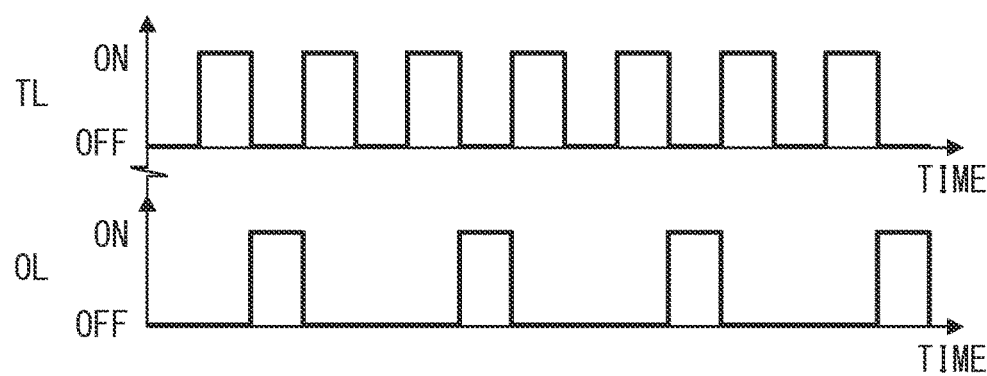
FIG. 14 is a diagram for illustrating an example in which a blink cycle of the vehicle exterior notification and a blink cycle of a turn lamp are different.

Here, with reference to FIG. 14, an example in which cycles of blink of the vehicle exterior notification and blink of a turn lamp are different will be described. A vertical axis in FIG. 14 indicates on-off states of light emission. A horizontal axis in FIG. 14 indicates time. TL in FIG. 14 indicates the blinking cycle of the turn lamp. OL in FIG. 14 indicates the blinking cycle of the vehicle exterior notification. For example, as shown in FIG. 14, the vehicle exterior notification controller 106 may set the blinking cycle of the vehicle exterior notification to be longer than the blinking cycle of the turn lamp. In order to make it easier to distinguish between the blink of the vehicle exterior notification and the blink of the turn lamp, as shown in FIG. 14, the lighting timing of the blink of the vehicle exterior notification and the blink of the turn lamp may be shifted.

Although FIG. 14 shows a configuration in which the blinking cycle of the vehicle exterior notification is longer than the blinking cycle of the turn lamp, the present disclosure is not necessarily limited to the configuration. For example, a configuration may be adopted in which the blinking cycle of the vehicle exterior notification is set shorter than the blinking cycle of the turn lamp.

It is preferable that the vehicle exterior notification controller 106 increases the brightness of the vehicle exterior notification as the brightness in the periphery of the subject vehicle identified by the brightness identification unit 105 increases. On the other hand, it is preferable that the vehicle exterior notification controller 105 decreases the brightness of the vehicle exterior notification as the brightness in the periphery of the subject vehicle identified by the brightness identification unit 105 decreases. According to this, even when the peripheral brightness of the subject vehicle is high, it is possible to perform the vehicle exterior notification with brightness that is easily visible in the periphery. Further, even when the brightness in the periphery of the subject vehicle is low, such as at night or in a tunnel, it is possible to perform the vehicle exterior notification with brightness that does not overly dazzle the periphery.

Figure 15:
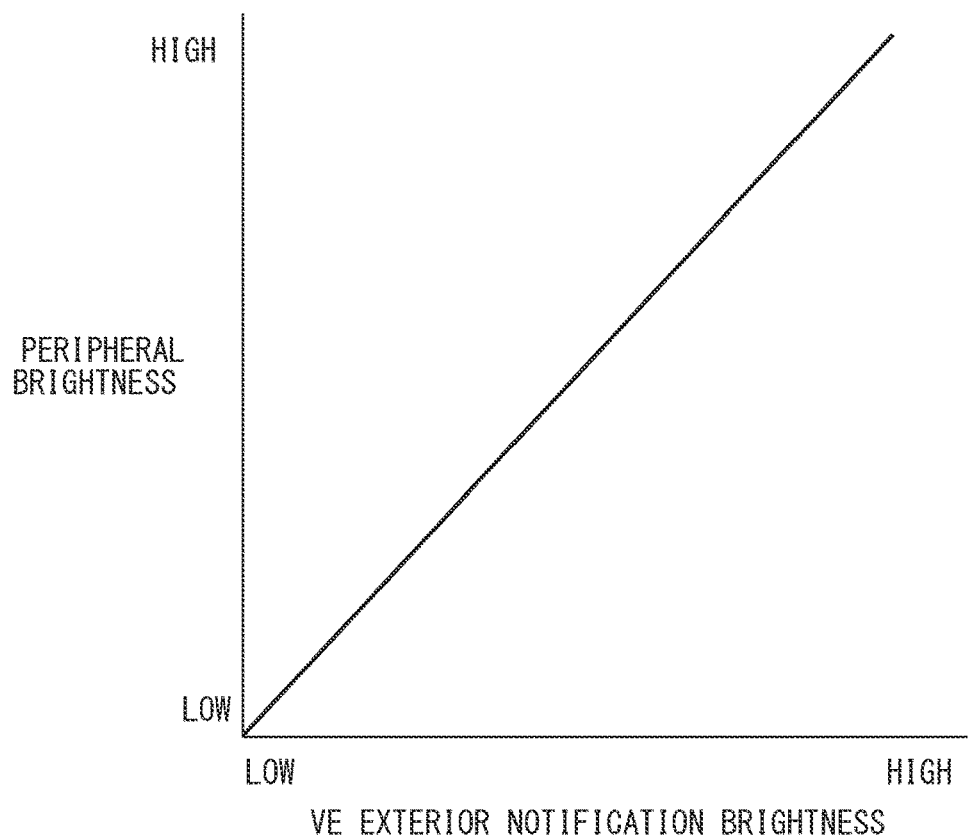
FIG. 15 is a diagram for illustrating an example of changing brightness of the vehicle exterior notification according to brightness of the periphery of the subject vehicle.

Here, with reference to FIG. 15, an example of changing brightness of the vehicle exterior notification according to brightness of the periphery of the subject vehicle will be described. The vertical axis of the graph in FIG. 15 indicates the brightness in the periphery the subject vehicle. The horizontal axis of the graph in FIG. 15 indicates the brightness as a standard for the vehicle exterior notification. The standard brightness may be set to brightness set as the standard when the brightness of the light emission of the vehicle exterior notification is changed according to the automated driving-related state identified by the state identification unit 104. In the case of increasing or decreasing the brightness of the light emission of the vehicle exterior notification according to the automated driving-related state, the brightness may be increased or decreased from the standard brightness. As shown in FIG. 15, the vehicle exterior notification controller 106 increases the brightness of the vehicle exterior notification as the brightness in the periphery of the vehicle increases. On the other hand, the vehicle exterior notification controller 106 decreases the brightness of the vehicle exterior notification as the brightness in the periphery of the subject vehicle decreases.

The area where the lamp as the vehicle exterior display 191 emits light is not limited to the configuration fixed to a partial area. For example, the number of the light emission elements to emit light may be limited, and the part of the light emitting elements to emit light may be switched. Thereby, the lamp emission area may be sequentially switched. In other words, a configuration may be employed in which light is emitted such that the light emission area moves. In this case, the different states of automated driving of the subject vehicle may be represented by the difference in direction in which the light emission area is switched. In other words, the difference in the direction in which the light emission area is switched may be used as the difference in the type of vehicle exterior notification.

According to the configuration of the first embodiment, it is possible to change the type of vehicle exterior notification, which is the notification of information regarding automated driving to the outside of the subject vehicle, according to the state of the vehicle regarding the automated driving. Therefore, as described above, the different states of automated driving of the subject vehicle can be easily understood by the periphery of the subject vehicle depending on the type of vehicle exterior notification. As the result, when the vehicle performs the automated driving, it is possible to notify objects in the periphery of the subject vehicle of the different states of the automated driving of the subject vehicle so that the objects easily understand the different states.

Second Embodiment

The present disclosure is not limited to the configuration described in the first embodiment, but can also adopt the following configuration as a second embodiment. The following will describe an example of a configuration of a second embodiment with reference to the accompanying drawings.

<Schematic Configuration of Vehicle System>

Figure 16:
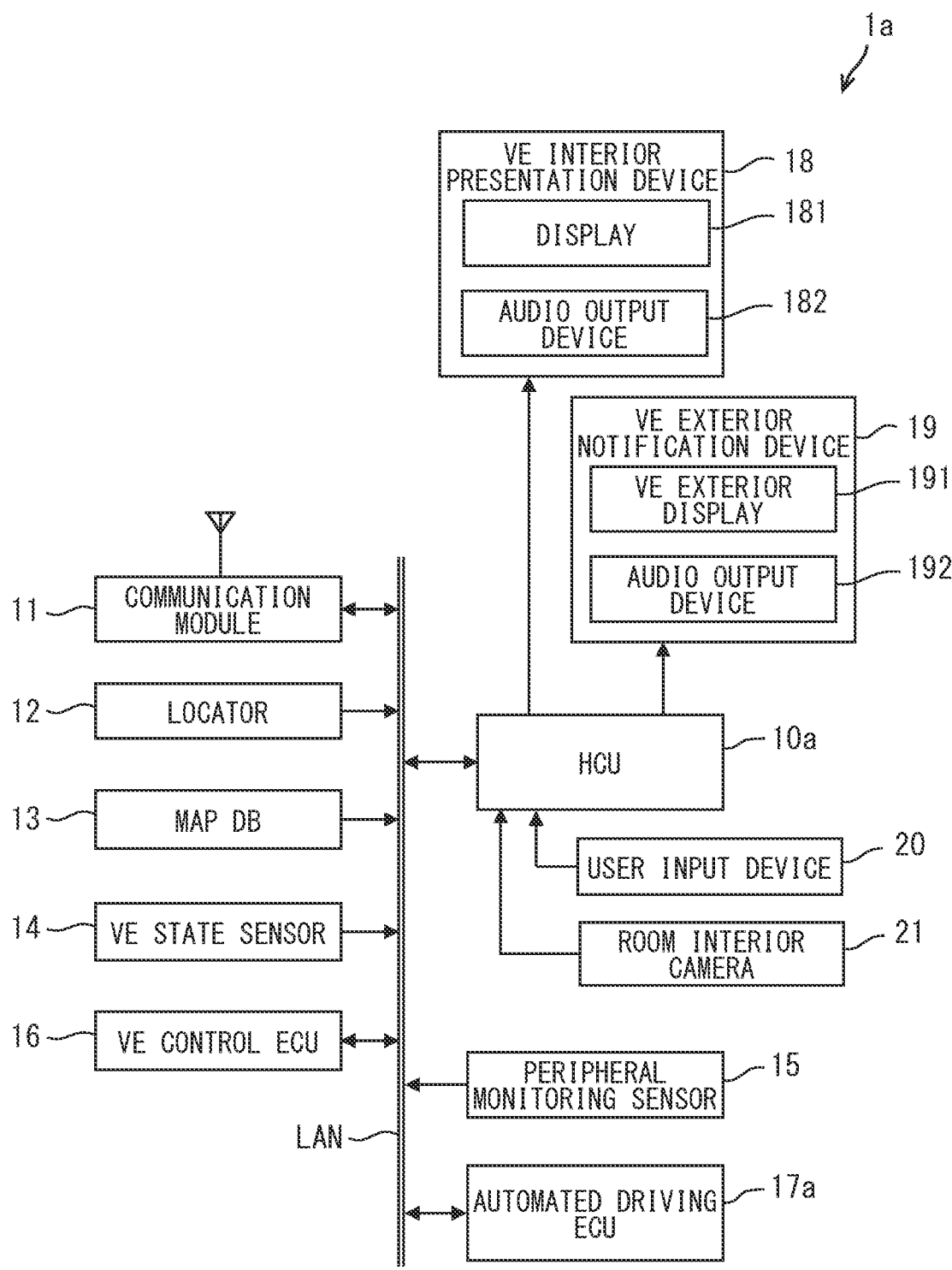
FIG. 16 is a diagram showing an example of a schematic configuration of a vehicle system.

A vehicle system 1*a* shown in FIG. 16 can be used in an automated driving vehicle. As shown in FIG. 16, the vehicle system 1*a* includes an HCU 10*a*, the communication module 11, the locator 12, the map DB 13, the vehicle state sensor 14, the periphery monitoring sensor 15, the vehicle control ECU 16, an automated driving ECU 17*a*, the vehicle interior presentation device 18, the vehicle exterior notification device 19, the user input device 20, and a room interior camera 21. The vehicle system 1*a* is similar to the vehicle system 1 of the first embodiment, except that the vehicle system 1*a* includes the HCU 10*a* and the automated driving ECU 17*a* instead of the HCU 10 and the automated driving ECU 17, and that it includes the room interior camera 21. For example, the HCU 10*a*, the communication module 11, the locator 12, the map DB 13, the vehicle state sensor 14, the periphery monitoring sensor 15, the vehicle control ECU 16, and the automated driving ECU 17*a* are connected to a vehicle interior LAN (see LAN in FIG. 16). Although the vehicle using the vehicle system 1*a* is not necessarily limited to an automobile, hereinafter, an example using the automobile will be described.

The automated driving ECU 17*a* is similar to the automated driving ECU 17 of the first embodiment, except that at least LCA (Lane Change Assist) control and LTC (Lane Tracing control) control are executed by a control execution unit. The LCA control is control for automatically moving the subject vehicle from the subject vehicle lane to the adjacent lane. The LCA control generates, based on the recognition result of the traveling environment by the traveling environment recognition unit, and the like, a planned traveling trajectory having a shape that smoothly connects the target position of the subject vehicle lane and the center of the adjacent lane. Then, by automatically controlling the steering angle of the steering wheel of the subject vehicle according to the planned traveling trajectory, the lane may be changed from the subject vehicle lane to the adjacent lane. In the LCA control, when a situation occurs in which lane change is not possible after the lane change is started but before the lane change is completed, the lane change may be interrupted and waited. The LTC control is a control to keep the vehicle in the subject vehicle lane. In the LTC control, the steering control is performed so as to keep the subject vehicle traveling within the lane. When starting the lane change under the LCA control, the LTC control should be temporarily interrupted to enable the vehicle to exit from the subject vehicle lane. Then, the LTC control may be restarted after the traveling lane change is completed.

The room interior camera 21 captures an image of a predetermined range in the passenger compartment of the subject vehicle. The room interior camera 21 should just capture the range including the driver's seat of the subject vehicle at least. That is, the room interior camera 21 captures the driver of the subject vehicle. The room interior camera 21 includes, for example, a near-infrared light source and a near-infrared camera, and a control unit that controls these. The room interior camera 21 uses the near-infrared camera to capture the occupant of the subject vehicle to which the near-infrared light is emitted from the near-infrared light source. An image captured by the near-infrared camera is subjected to image analysis by the control unit. The control unit analyzes the captured image to detect the feature amount of the occupant's face. The control unit may detect the occupant's face orientation, the occupant's line-of-sight direction, and the like, based on the detected upper body feature amount including the occupant's face.

<Schematic Configuration of HCU>

Figure 17:
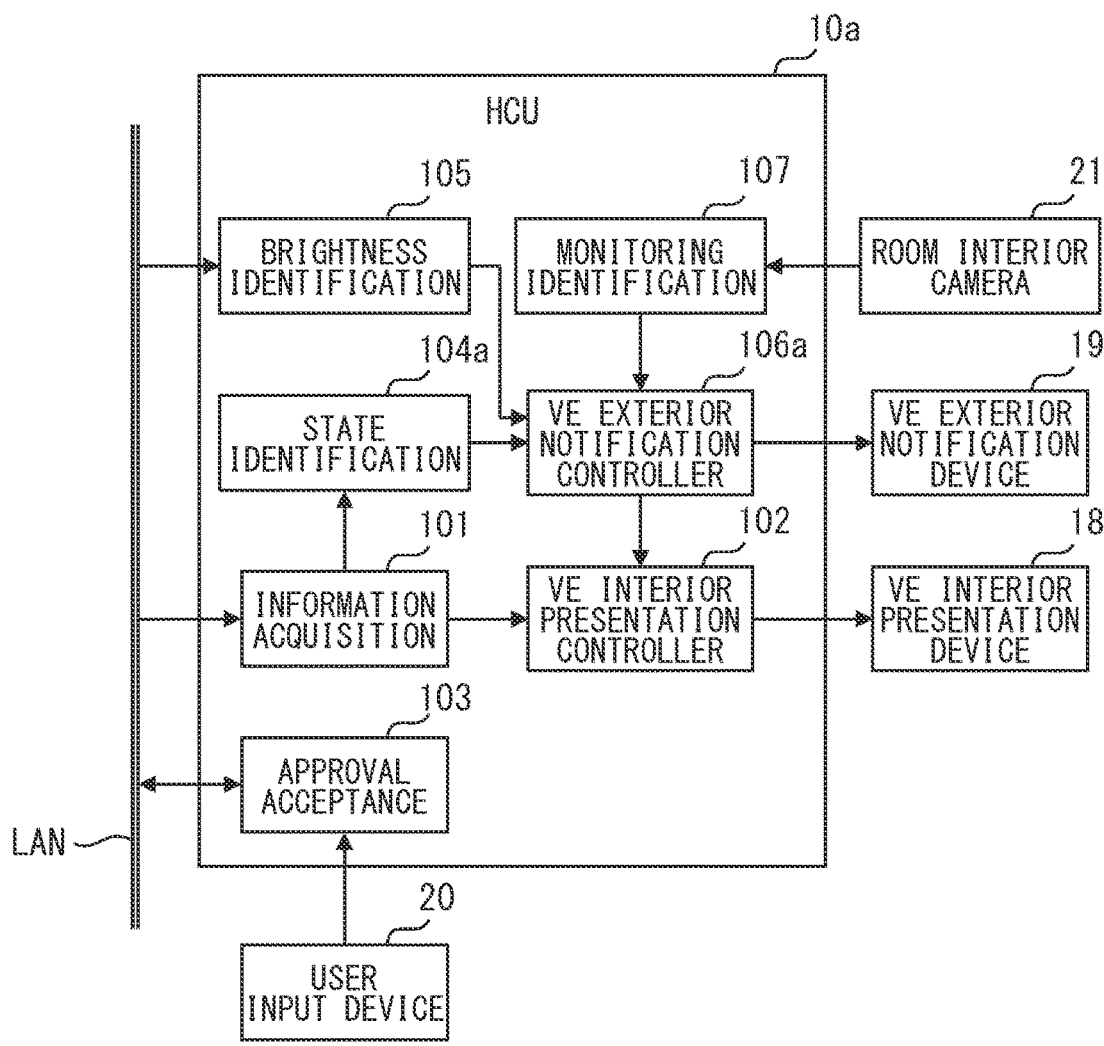
FIG. 17 is a diagram showing an example of a configuration of the HCU.

Next, a schematic configuration of the HCU 10 will be described with reference to FIG. 17. As shown in FIG. 17, the HCU 10*a* includes the information acquisition unit 101, the vehicle interior presentation controller 102, the approval acceptance unit 103, a state identification unit 104*a*, the brightness identification unit 105, a vehicle exterior notification controller 106*a*, and a monitoring identification unit 107 as functional blocks regarding the control of the vehicle interior presentation device 18 and the vehicle exterior notification device 19. The HCU 10*a* is similar to the HCU 10 of the first embodiment, except that the HCU 10*a* includes the state identification unit 104*a* and the vehicle exterior notification controller 106*a* instead of the state identification unit 104 and the vehicle exterior notification controller 106, and that the HCU 10*a* includes the monitoring identification unit 107. This HCU 10*a* also corresponds to the vehicle notification control device. Execution of a process of each functional block of the HCU 10*a* by the computer also corresponds to execution of the vehicle notification control method.

The state identification unit 104*a* is similar to the state identification unit 104 of the first embodiment, except that the automated driving-related state to be identified is partially different. Hereinafter, differences from the state identification unit 104 of the first embodiment will be described. The state identification unit 104*a* distinguishes at least whether an automatic lane change is being performed or lane keeping traveling is being performed for the identification of the automated driving-related state. During the lane keeping traveling, the traveling is automatically kept with the lane. That is, the state identification unit 104*a* distinguishes whether the LCA control is being performed or the LTC control is being performed for the identification.

The monitoring identification unit 107 identifies whether the driver of the subject vehicle is monitoring the periphery. The monitoring identification unit 107 may identify whether the driver is monitoring the periphery from the driver's face direction, line-of-sight direction, and the like detected by the room interior camera 21.

The vehicle exterior notification controller 106*a* is similar to the exterior notification controller 106 of the first embodiment, except that some processes are different. Hereinafter, differences from the vehicle exterior notification controller 106 of the first embodiment will be described. When the state identification unit 104*a* identifies, as the automated driving-related state, that the lane keeping traveling is in progress, the vehicle exterior notification controller 106*a* performs the vehicle exterior notification that turns on the light. That is, when identifying that the LTC control is being executed, the vehicle exterior notification controller 106*a* performs the vehicle exterior notification that turns on the light (see FIG. 18). On the other hand, when the state identification unit 104a identifies, as the automated driving-related state, that the automatic lane change is being performed, the vehicle exterior notification controller 106 performs the vehicle exterior notification that blinks the vehicle exterior display 191. That is, when the vehicle exterior notification controller 106a determines that the LCA control is being executed, the vehicle exterior notification controller 106a performs the vehicle exterior notification that blinks the vehicle exterior display 191 (see FIG. 18). According to this, it is possible to notify the periphery of the subject vehicle in the easy-to-understand manner of whether the lane keeping operation is being performed or the automatic lane change is being performed.

When the state identification unit 104a identifies, as the automated driving-related state, that the automatic lane change is in progress, it is preferable that the vehicle exterior notification controller 106a causes the blink as the vehicle exterior notification at the same cycle as the blink of the turn lamp of the subject vehicle. According to this, the blinking cycle of the turn lamp indicating the lane change is the same as the cycle of blinking indicating that the automatic lane change is in progress. Therefore, as compared with the case where the blinking timings representing similar contents are different, it is possible to reduce discomfort.

Figures 18, 19, 20:
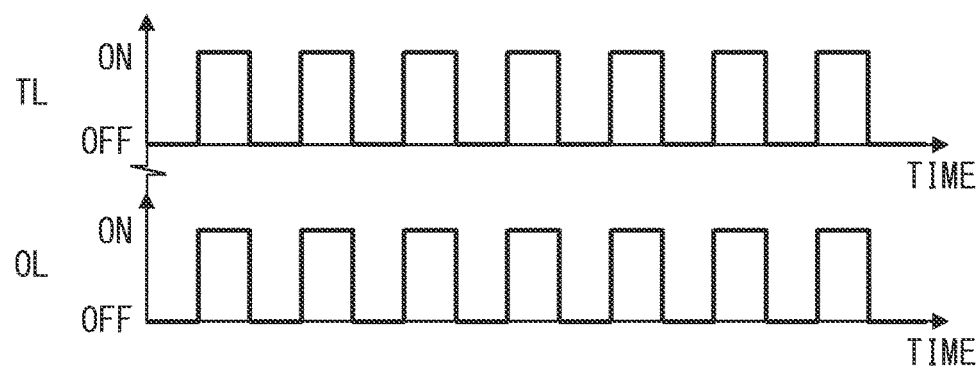
FIG. 18 is a diagram for illustrating an example of changing the type of vehicle exterior notification according to whether lane keeping travel is being performed or automated lane change is being performed.
FIG. 19 is a diagram for illustrating an example in which the blink cycles of the vehicle exterior notification and the blink of the turn lamp are matched.
FIG. 20 is a diagram for illustrating an example of changing the vehicle exterior notification according to whether a driver monitors the periphery during the automated lane change.

Here, with reference to FIG. 19, an example in which the cycles of the blink of the vehicle exterior notification and the blink of the turn lamp are matched will be described. A vertical axis in FIG. 19 indicates the on-state and the off state of light emission. A horizontal axis of FIG. 19 indicates time. TL in FIG. 19 indicates the blinking cycle of the turn lamp. OL in FIG. 19 indicates the blinking cycle of the vehicle exterior notification. As shown in FIG. 19, the vehicle exterior notification controller 106a may match the blinking cycle of the vehicle exterior notification controller 106 with the blinking cycle of the turn lamp.

When the state identification unit 104a identifies, as the automated driving-related state, that the automatic lane change is in progress, it is preferable that the vehicle exterior notification controller 106a changes the mode of the vehicle exterior notification according to whether the monitoring identification unit 107 identifies whether the driver monitors the periphery. According to this, it is possible to notify the periphery of the subject vehicle whether the driver is monitoring the periphery in the easy-to-understand manner during the execution of the automatic lane change.

When the state identification unit 104a identifies, as the automated driving-related state, the state where the automatic lane change is in progress, and when the monitoring identification unit 107 identifies that the driver is monitoring the periphery, the vehicle exterior notification controller 106a may not perform the vehicle exterior notification. On the other hand, when the state identification unit 104a identifies, as the automated driving-related state, the state where the automatic lane change is in progress, and when the monitoring identification unit 107 does not identify that the driver is monitoring the periphery, the vehicle exterior notification controller 106a may not perform the blink as the vehicle exterior notification. It is assumed that the subject vehicle turn lamp, which is a direction indicator, blinks during the automatic lane change.

Here, with reference to FIG. 20, an example of changing the vehicle exterior notification according to whether the driver monitors the periphery during the automated lane change will be described. As shown in FIG. 20, the vehicle exterior notification controller 106a does not turn on the lamp for the vehicle exterior notification when the driver is monitoring the periphery during execution of the LCA control. On the other hand, as shown in FIG. 20, the vehicle exterior notification controller 106a blinks the lamp for the vehicle exterior notification when the driver is not monitoring the periphery during execution of the LCA control. Also, as shown in FIG. 20, it is assumed that the turn lamp blinks during execution of the LCA control regardless of whether the driver is monitoring the periphery.

Third Embodiment

The present disclosure is not limited to the configuration described in the first embodiment, but can also adopt the following configuration as a third embodiment. The following will describe an example of a configuration of the third embodiment with reference to the accompanying drawings.
<Schematic Configuration of Vehicle System>

Figure 21:
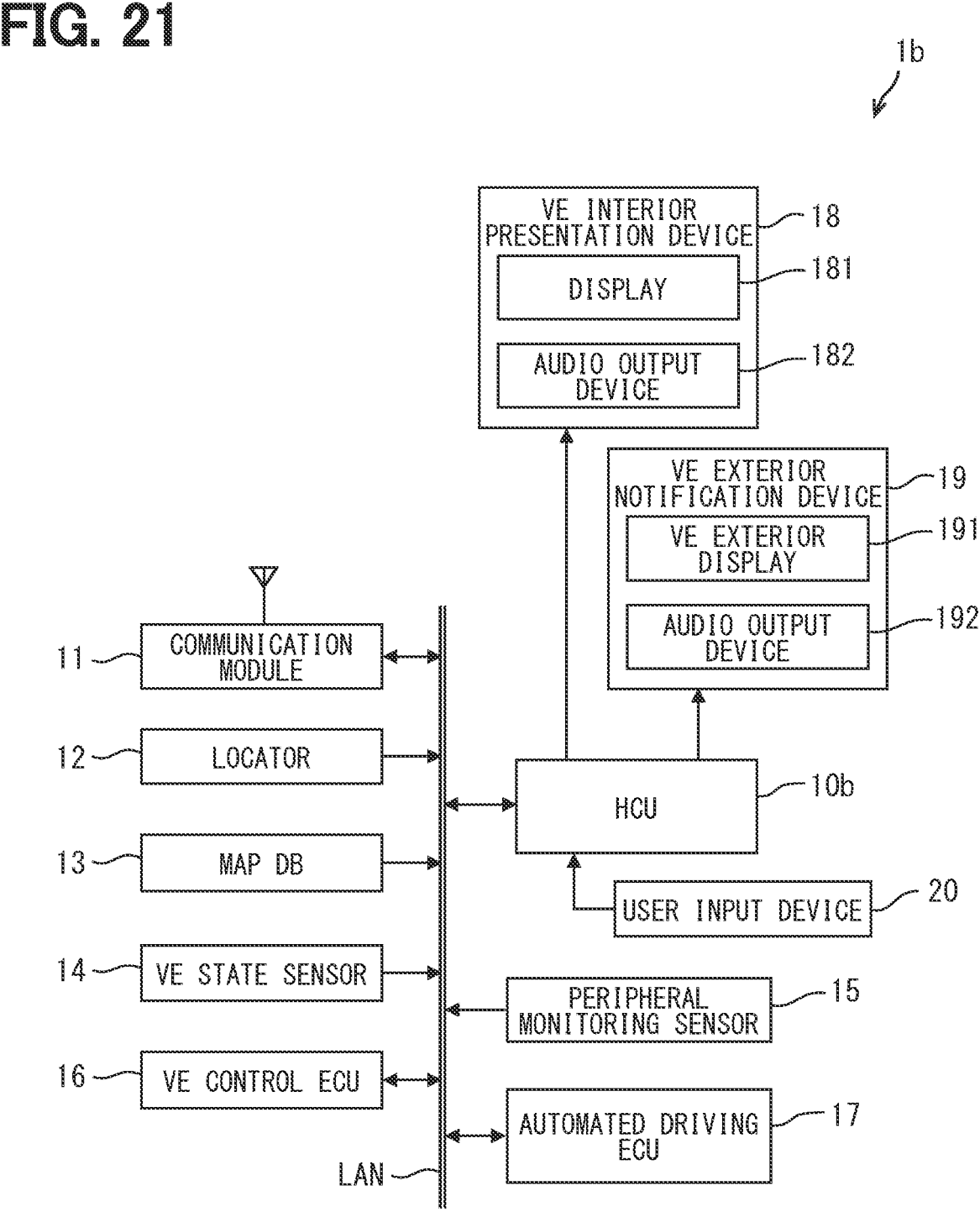
FIG. 21 is a diagram showing an example of a schematic configuration of a vehicle system.

A vehicle system 1b illustrated in FIG. 21 can be used in an automobile. As shown in FIG. 21, the vehicle system 1b includes an HCU 10b, the communication module 11, the locator 12, the map DB 13, the vehicle state sensor 14, the periphery monitoring sensor 15, the vehicle control ECU 16, the automated driving ECU 17, the vehicle interior presentation device 18, the vehicle exterior notification device 19, and the user input device 20. The vehicle system 1b is similar to the vehicle system 1 of the first embodiment, except for including an HCU 10b instead of the HCU 10. Although the vehicle using the vehicle system 1b is not necessarily limited to an automobile, hereinafter, an example using the automobile will be described.
<Schematic Configuration of HCU>

Figures 22, 23:
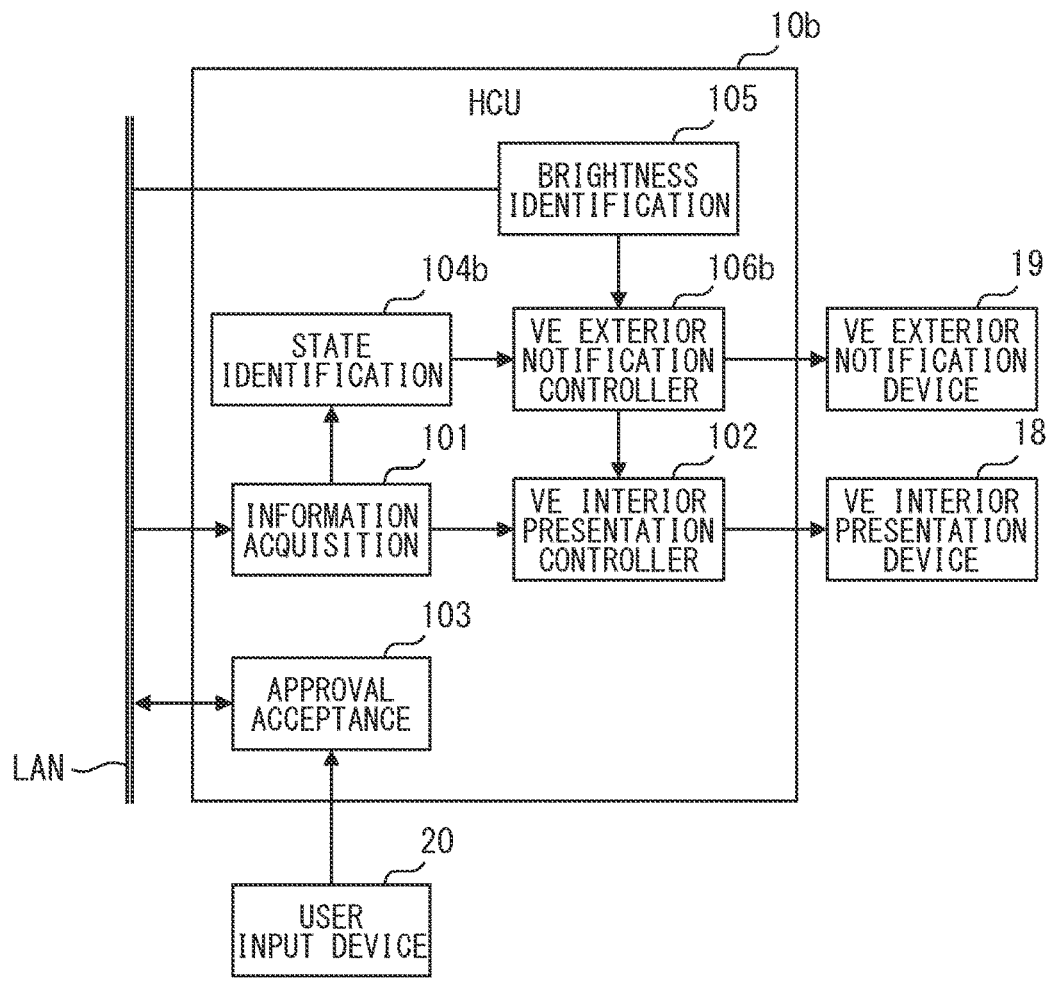
FIG. 22 is a diagram showing an example of a schematic configuration of an HCU.
FIG. 23 is a diagram for illustrating an example of changing the vehicle exterior notification according to a place where automated driving without monitoring obligation is performed.

Next, a schematic configuration of the HCU 10b will be described with reference to FIG. 22. As shown in FIG. 22, the HCU 10b includes the information acquisition unit 101, the vehicle interior presentation controller 102, the approval acceptance unit 103, a state identification unit 104b, the brightness identification unit 105, a vehicle exterior notification controller 106b, and a monitoring identification unit 107 as functional blocks regarding the control of the vehicle interior presentation device 18 and the vehicle exterior notification device 19. The HCU 10b is similar to the HCU 10 of the first embodiment, except that the state identification unit 104b and the vehicle exterior notification controller 106b are provided instead of the state identification unit 104 and the vehicle exterior notification controller 106, respectively. This HCU 10b also corresponds to the vehicle notification control device. Execution of a process of each functional block of the HCU 10b by the computer also corresponds to execution of the vehicle notification control method.

The state identification unit 104b is similar to the state identification unit 104 of the first embodiment, except that the automated driving-related state to be identified is partially different. Hereinafter, differences from the state identification unit 104 of the first embodiment will be described. The state identification unit 104 at least distinguishes whether automated driving without the monitoring obligation is being performed on a general road or on an expressway for the identification of the automated driving-related state. The general road referred to here can be rephrased as a road on which pedestrians or bicycles pass. By monitoring the automated driving ECU 17, the state identification unit 104 may identify whether the automated driving without the monitoring obligation is being performed on the general road or on the expressway.

It is preferable that the state identification unit 104b also distinguishes whether a passerby is detected for the identification of the automated driving-related state. The passerby includes a passersby on foot (that is, pedestrian), a passerby on bicycles, and the like. The passerby may be configured not to be limited to a passerby entering the general road. The state identification unit 104b may identify whether the passerby is detected by monitoring the automated driving ECU 17. The automated driving ECU 17 may detect the passerby located within the sensing range of the periphery monitoring sensor 15, for example.

The vehicle exterior notification controller 106b is similar to the vehicle exterior notification controller 106 of the first embodiment, except that some processes are different. Hereinafter, differences from the vehicle exterior notification controller 106 of the first embodiment will be described. When the state identification unit 104b identifies that the automated driving without the monitoring obligation is being performed on the general road, the vehicle exterior notification controller 106b causes the vehicle exterior notification to be performed by the audio. In other words, the vehicle exterior notification is performed by the audio output from the audio output device 192. On the other hand, when the state identification unit 104b identifies that the automated driving without the monitoring obligation is being performed on the expressway, the vehicle exterior notification controller 106b causes the vehicle exterior notification to be performed by display or light emission. That is, the vehicle exterior notification is performed by display or light emission by the vehicle exterior display 191. According to this, it is possible to perform vehicle exterior notification suitable for places where the automated driving without the monitoring obligation is being performed. The details will be described as follows. On the general road where there is the passersby, it is possible to perform the vehicle exterior notification using the audio so that the passersby can easily recognize it. On the other hand, on the expressway where there is no passersby, it is possible to perform the vehicle exterior notification for the other vehicles by using the display or the light emission, instead of using a wasteful audio.

When the state identification unit 104b identifies that the automated driving without the monitoring obligation has been performed on the general road, and identifies a state where the passerby has been detected, it is preferable that the vehicle exterior notification controller 106 cause the vehicle exterior notification to be performed by the audio. According to this, it is possible to reduce the wastefulness of performing the vehicle exterior notification by the audio when the passerby is not detected.

Here, with reference to FIG. 23, an example of changing the vehicle exterior notification according to a place where the automated driving without the monitoring obligation is performed will be described. The automated driving without the monitoring obligation is the automated driving with the automation level of LV 3 or higher. As shown in FIG. 23, the vehicle exterior notification controller 106b causes the vehicle exterior notification to be performed by the audio when the automated driving of LV 3 or higher has been performed on the general road and the passerby has been detected. On the other hand, as shown in FIG. 23, the vehicle exterior notification controller 106b does not cause the vehicle exterior notification when the automated driving of LV 3 or higher has been performed on the general road and no passerby has been detected. Further, as shown in FIG. 23, the vehicle exterior notification controller 106b causes the vehicle exterior notification to be performed by display or light emission when the automated driving of LV 3 or higher has been performed on the expressway.

Fourth Embodiment

The present disclosure is not limited to the configuration described in the first embodiment, but can also adopt the following configuration as a fourth embodiment. The following will describe a detailed example of the fourth embodiment with reference to the accompanying drawings.

<Schematic Configuration of Vehicle System>

Figure 24:
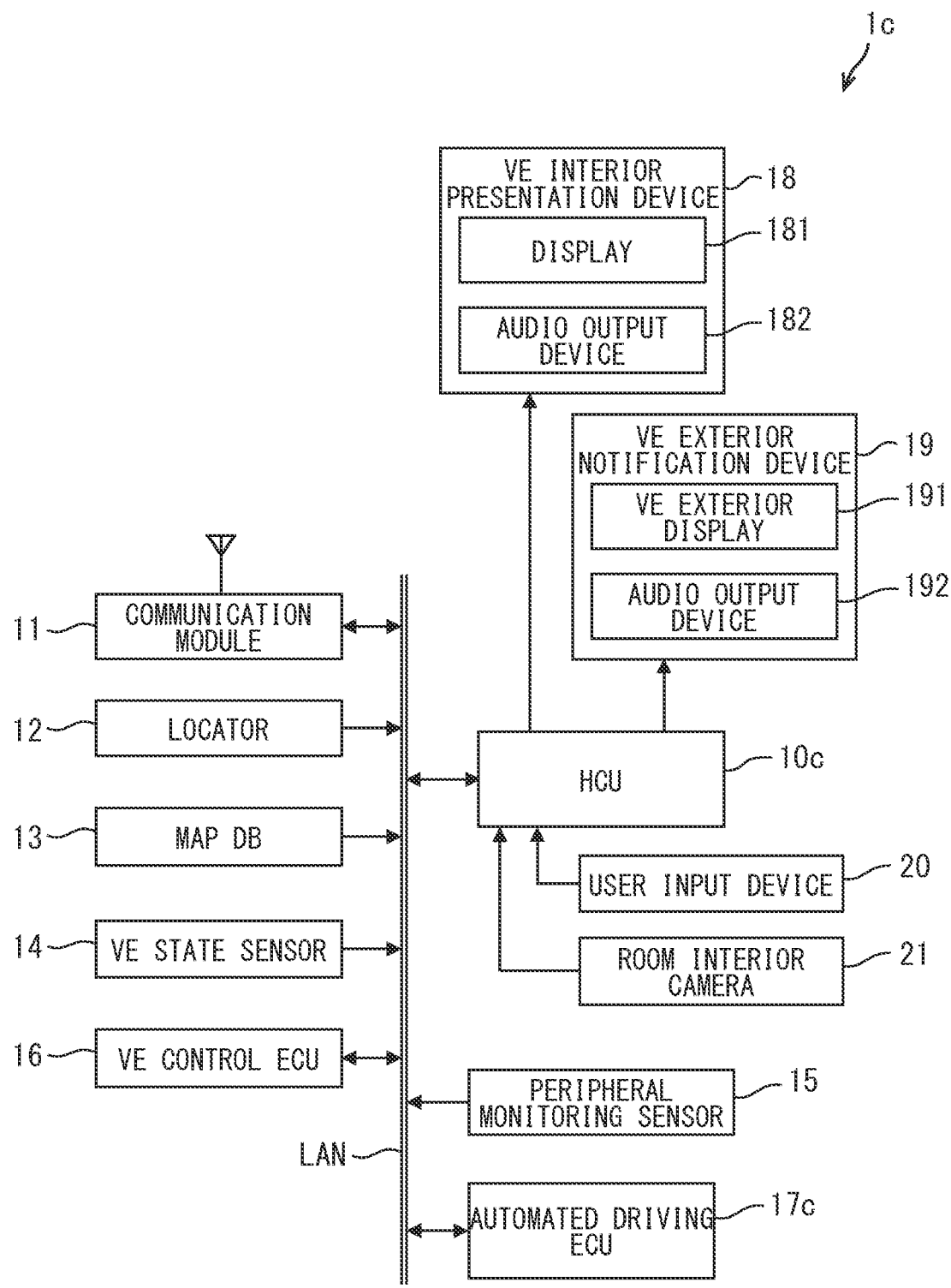
FIG. 24 is a diagram showing an example of a schematic configuration of a vehicle system.

A vehicle system 1c shown in FIG. 24 can be used in an automobile (hereinafter, simply a vehicle). As shown in FIG. 24, the vehicle system 1c includes an HCU 10c, the communication module 11, the locator 12, the map DB 13, the vehicle state sensor 14, the periphery monitoring sensor 15, the vehicle control ECU 16, an automated driving ECU 17c, the vehicle interior presentation device 18, the vehicle exterior notification device 19, the user input device 20, and the room interior camera 21. The vehicle system 1c is similar to the vehicle system 1 of the first embodiment, except that the vehicle system 1c includes the HCU 10c and the automated driving ECU 17c instead of the HCU 10 and the automated driving ECU 17, and that the vehicle system 1c includes the room interior camera 21. For example, the HCU 10c, the communication module 11, the locator 12, the map DB 13, the vehicle state sensor 14, the periphery monitoring sensor 15, the vehicle control ECU 16, and the automated driving ECU 17c are connected to a vehicle interior LAN (see LAN in FIG. 24). Although the vehicle using the vehicle system 1c is not necessarily limited to an automobile, hereinafter, an example using the automobile will be described.

The automated driving ECU 17c is similar to the automated driving ECU 17 of the first embodiment, except that it functions as a dead man system. The automated driving ECU 17c corresponds to the dead man system. The function as a dead man system is a function that detects a state where the driver is unable to drive the vehicle, automatically causes the subject vehicle to evacuate, blink hazard lamps (in other words, blink hazard lights), and sound a horn. The horn can be rephrased as a klaxon. The state where the driver is unable to drive the vehicle can be rephrased as a dead man state. Further, the state may be also referred to as an undrivable state. The undrivable state is a state where the driver state is estimated to be difficult to return to a drivable state, may exclude a sleeping state. The automated driving ECU 17c may detect the driver undrivable state from the image of the driver captured by the room interior camera 21. The automated driving ECU 17c may detect the driver undrivable state by recognizing the driver posture collapse, the driver white-eyed state, and the like from the driver image. The automated driving ECU 17c may detect the driver undrivable state from the biological information of the driver detected by a biological sensor. The automated driving ECU 17c controls the vehicle control ECU 16 to take an evacuation action. The automated driving ECU 17c may automatically cause the vehicle to travel to a specific area recommended as an emergency evacuation area and then stop the vehicle as the evacuation action. The specific area on the expressway includes a rest area, an emergency parking zone, and the like. The specific area on the general road includes a side strip.

<Schematic Configuration of HCU>

Figure 25:
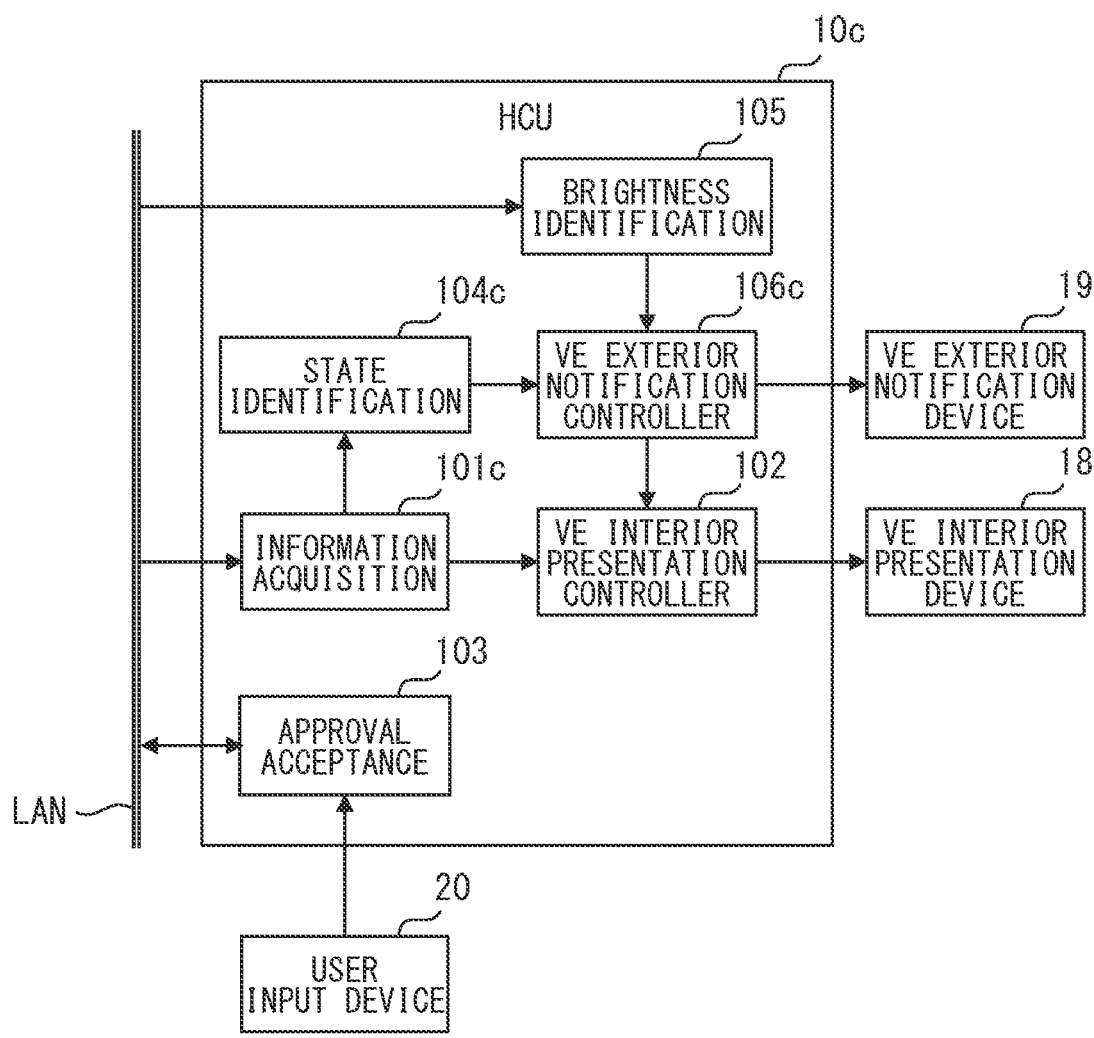
FIG. 25 is a diagram showing an example of a configuration of the HCU.

Next, a schematic configuration of the HCU 10c will be described with reference to FIG. 25. As shown in FIG. 25, the HCU 10c includes an information acquisition unit 101c, the vehicle interior presentation controller 102, the approval acceptance unit 103, a state identification unit 104c, the brightness identification unit 105, a vehicle exterior notification controller 106c, and the monitoring identification unit 107 as functional blocks regarding the control of the vehicle interior presentation device 18 and the vehicle exterior notification device 19. The HCU 10c is similar to the HCU 10 of the first embodiment, except that the information acquisition unit 101c, the state identification unit 104c, and the vehicle exterior notification controller 106c are provided instead of the information acquisition unit 101, the state identification unit 104 and the vehicle exterior notification controller 106, respectively. This HCU 10c also corresponds to the vehicle notification control device. Execution of a process of each functional block of the HCU 10c by the computer also corresponds to execution of the vehicle notification control method.

The information acquisition unit 101c is similar to the information acquisition unit 101 of the first embodiment except that the information to be acquired is partially different. Differences from the information acquisition unit 101 of the first embodiment will be described below. The information acquisition unit 101c acquires information about the operation state of the function as the dead man system in the automated driving ECU 17c.

The state identification unit 104c is similar to the state identification unit 104 of the first embodiment, except that the automated driving-related state to be identified is partially different. Hereinafter, differences from the state identification unit 104 of the first embodiment will be described. The state identification unit 104c distinguishes whether the automated driving ECU 17c causes the vehicle to perform the evacuation action for the identification the automated driving-related state. That is, the state identification unit 104c distinguishes whether the dead man system causes the evacuation action to be performed for the identification. The state identification unit 104c may identify whether the automated driving ECU 17c causes the vehicle to perform the evacuation action based on the information about the operation state of the function as the dead man system, the information being acquired from the automated driving ECU 17c.

The vehicle exterior notification controller 106c is similar to the exterior notification control unit 106 of the first embodiment, except that some processes are different. Hereinafter, differences from the vehicle exterior notification controller 106 of the first embodiment will be described. When the state identification unit 104c identifies a state where the dead man system causes the vehicle to take the evacuation action, the vehicle exterior notification controller 106c causes the vehicle exterior notification together with the blink of the hazard lamp and the execution of sounding the horn. For example, the vehicle exterior notification controller 106c may cause the vehicle exterior notification while the hazard lamp is blinked and the horn is sounded. When the state identification unit 104c identifies the state where the dead man system causes the evacuation action, the vehicle exterior notification controller 106c causes a vehicle exterior notification different from the vehicle exterior notification in a case where the state identification unit 104 dose not identify that the dead man system causes the evacuation action. According to this, it is possible to notify the periphery of the subject vehicle in the easy-to-understand manner whether the dead man system causes the evacuation action. As an example, during the automated driving, depending on whether the dead man system is causing the vehicle to take the evacuation action, blinking and lighting of the lamp may be selectively used. In addition, during the automated driving, the light color of the lamp or the color of the display may be used differently depending on whether the dead man system is causing the vehicle to take the evacuation action. For example, when the dead man system is causing the vehicle to take the evacuation action, a warning color may be used as the light color of the lamp and the color of the display.

Figures 26, 27:
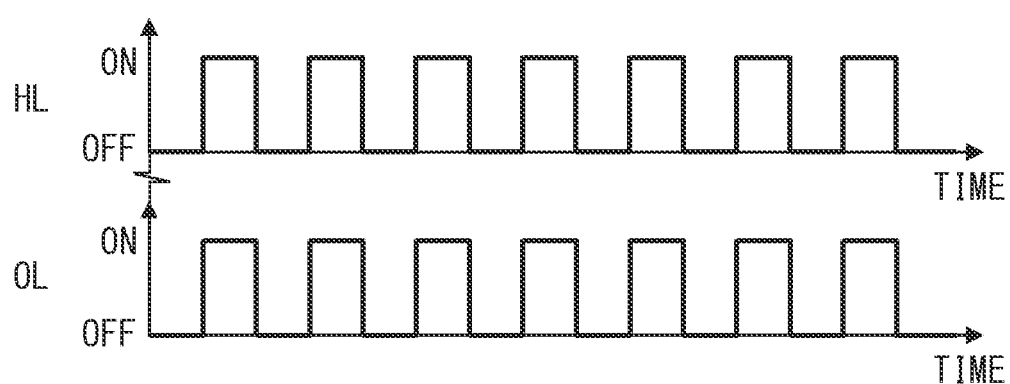
FIG. 26 is a diagram for illustrating an example in which the vehicle exterior notification is changed according to whether a dead man system causes the vehicle to take an evacuation action.
FIG. 27 is a diagram for illustrating an example in which blink cycles of the vehicle exterior notification and the hazard lamp are matched.

Here, with reference to FIG. 26, an example in which the vehicle exterior notification is changed according to whether the dead man system causes the vehicle to take the evacuation action. As shown in FIG. 26, the vehicle exterior notification controller 106c may turn on a blue lamp for the vehicle exterior notification, for example, when the dead man system does not cause the evacuation action. When the subject vehicle is not automatically driving, the lighting as the vehicle exterior notification may not be performed. On the other hand, as shown in FIG. 26, the vehicle exterior notification controller 106c may flash a red lamp as the vehicle exterior notification, for example, when the dead man system causes the vehicle to take the evacuation action.

When the state identification unit 104c identifies that the dead man system causes the vehicle to take the evacuation action, it is preferable that the vehicle exterior notification controller 106c causes the vehicle exterior notification of the blink at the same cycle as the blink of the hazard lamp. The blink of the hazard lamps corresponds to the blink of both the left and right turn lamps of the subject vehicle. According to this, the blinking cycle of the hazard lamps indicating an emergency and the blinking cycle indicating that the evacuation action is being performed are same. Therefore, as compared with the case where the blinking timings representing similar contents are different, it is possible to reduce discomfort.

Here, with reference to FIG. 27, an example in which the cycles of the blink of the vehicle exterior notification and the blink of the hazard lamp are matched will be described. A vertical axis in FIG. 27 indicates the on-state and the off-state of light emission. A horizontal axis of FIG. 27 indicates time. HL in FIG. 27 indicates the blinking cycle of the hazard lamp. OL in FIG. 27 indicates the cycle of flashing of the vehicle exterior notification. As shown in FIG. 27, the vehicle exterior notification controller 106c may match the blinking cycle of the vehicle exterior notification with the blinking cycle of the hazard lamps.

Fifth Embodiment

Further, as the vehicle exterior display 191, a lamp is used, and the lamp lights toward the outside of the subject vehicle for purposes other than vehicle exterior notification, which is notification of information related to the automated driving. In other words, the existing lamp may be configured to be used also for the vehicle exterior notification. Examples of the existing lamp include a side light, a turn light, a tail light, a brake light, a backlight, a number lights, a back fog light, and the like. The tail lamp may also be used as a brake lamp. As the existing lamp that is also used for the vehicle exterior notification, it is preferable to use a lamp that is not frequently flashed for purposes other than the vehicle exterior notification. This is to prevent a situation where the vehicle exterior notification cannot be performed at the timing at which the vehicle exterior notification should be performed. Examples of the existing lamp that is also used for the vehicle exterior notification include the backlight, the side light, a license plate light, the back fog light, and the like. For the existing lamp that is also used for the vehicle exterior notification, confusion can be avoided by, for example, using different hues of lamp colors between the vehicle exterior notification and purposes other than the vehicle exterior notification.

Sixth Embodiment

In the first and second embodiments, the configuration has been described in which the vehicle exterior notification can be performed by both the vehicle exterior display 191 and the audio output device 192. However, the present disclosure is not necessarily limited to this configuration. For example, among the vehicle exterior display 191 and the audio output device 192, only the vehicle exterior display 191 may perform the vehicle exterior notification. Alternatively, among the vehicle exterior display 191 and the audio output device 192, only the audio output device 192 may perform the vehicle exterior notification.

Seventh Embodiment

In the first to third embodiments, the configuration has been described in which the vehicle exterior notification is performed by emitting light from the lamp. However, the present disclosure is not necessarily limited to this configuration. For example, the vehicle exterior notification may be made by displaying text or images on a display, display panel or the like instead of emitting light from the lamp.

Eighth Embodiment

In the first to fourth embodiments, the configuration has been described in which the vehicle interior notification can be performed by both the display 181 and the audio output device 182. However, the present disclosure is not necessarily limited to this configuration. For example, among the vehicle exterior display 181 and the audio output device 182, only the display 181 may perform the vehicle interior notification. Alternatively, among the display 181 and the audio output device 182, only the audio output device 182 may perform the vehicle interior notification.

Ninth Embodiment

In first to fourth embodiments, the configuration have been described in which the HCUs 10, 10a, 10b, and 10c perform the functions of the state identification units 104, 104a, 104b, and 104c, the brightness identification unit 105, and the vehicle exterior notification controllers 106, 106a, 106b, and 106c. However, the present disclosure is not necessarily limited to these configurations. For example, the functions of the state identification units 104, 104a, 104b, and 104c, the brightness identification unit 105, and the vehicle exterior notification controllers 106, 106a, 106b, and 106c may be performed by an ECU other than the HCUs 10, 10a, 10b, and 10c. As an example, the functions of the state identification units 104, 104a, 104b, 104c, the brightness identification unit 105, and the vehicle exterior notification controllers 106, 106a, 106b, 106c may be performed by the automated driving ECUs 17, 17a, and 17c.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. Further, the controller and the method thereof described in the present disclosure may be implemented by a dedicated computer which includes a processor programmed to perform one or more functions executed by a computer program. Alternatively, the device and the method thereof described in the present disclosure may also be implemented by a dedicated hardware logic circuit. Alternatively, the device and the method thereof described in the present disclosure may also be implemented by one or more dedicated computers configured as a combination of a processor executing a computer program and one or more hardware logic circuits. The computer program may be stored in a computer-readable non-transitory tangible recording medium as an instruction to be executed by the computer.

The invention claimed is:

1. A vehicle notification control device for a vehicle capable of: performing automated driving at a plurality of automation levels; and switching the plurality of automation levels each indicating a degree of the automated driving, the vehicle notification control device comprising:
   a state identification unit configured to identify an automated driving-related state that is a state of the vehicle, the state being related to the automated driving; and
   a vehicle exterior notification controller configured to control a vehicle exterior notification device that performs vehicle exterior notification that is notification of information related to the automated driving toward an outside of the vehicle,
   wherein
   the vehicle exterior notification controller changes a type of the vehicle exterior notification according to the automated driving-related state identified by the state identification unit,
   the vehicle notification control device is usable for a vehicle capable of performing automated driving at the plurality of automation levels each having a different permission condition that enables the automated driving,
   the state identification unit is configured to distinguish at least the automated driving with the different permission condition to identify the automated driving-related state,
   the vehicle exterior notification controller uses the automated driving-related state identified by the state identification unit to change a type of the vehicle exterior notification in the automated driving with the different permission condition,
   the plurality of automation levels include a predictable automation level that requires a predictable duration,
   the predictable duration is a distance or a time length for enabling continuation of the automated driving,
   the state identification unit identifies the predictable duration as the automated driving-related state, and
   the vehicle exterior notification controller uses the automated driving-related state identified by the state identification unit to change the type of the vehicle exterior notification according to the predictable duration during the automated driving at the predictable automation level that requires the predictable duration.

2. The vehicle notification control device according to claim 1, wherein
   the vehicle notification control device is usable for a vehicle capable of performing the automated driving at the plurality of automation levels each having the different permission condition that enables the automated driving,
   the automated driving includes area limit automated driving that is performed in a limited area and permits automated driving without a monitoring obligation of a driver of the vehicle and traffic congestion limit automated driving that is limitedly performed during a traffic congestion and permits the automated driving without the monitoring obligation of the driver, the state identification unit is configured to identify at least whether the area limit automated driving or the traffic congestion limit automated driving is being performed as the automated driving-related state, and the vehicle exterior notification controller uses the automated driving-related state identified by the state identification unit to change the type of the vehicle exterior notification according to whether the area limit automated driving or the traffic congestion limit automated driving is being performed.

3. The vehicle notification control device according to claim 1, wherein the state identification unit identifies, as the automated driving-related state, a change in at least one of the plurality of automation levels of the vehicle, and the vehicle exterior notification controller uses the automated driving-related state identified by the state identification unit to change the type of the vehicle exterior notification according to the at least one of the plurality of automation levels of the vehicle.

4. The vehicle notification control device according to claim 3, wherein the vehicle exterior notification controller changes the type of vehicle exterior notification depending on whether a current automation level of the vehicle is an automation level corresponding to automated driving with a monitoring obligation or an automation level corresponding to automated driving without the monitoring obligation, by using the automated driving-related state identified by the state identification unit.

5. The vehicle notification control device according to claim 1, wherein the state identification unit identifies, as the automated driving-related state, an automation level change of the vehicle, and the vehicle exterior notification controller uses the automated driving-related state identified by the state identification unit to change the type of the vehicle exterior notification according to a degree of the automation level change of the vehicle.

6. The vehicle notification control device according to claim 1, wherein the state identification unit identifies, as the automated driving-related state, an automation level change in the vehicle, and the vehicle exterior notification controller uses the automated driving-related state identified by the state identification unit to change the type of the vehicle exterior notification according to whether a current automation level of the vehicle increases or decreases.

7. The vehicle notification control device according to claim 1, wherein the vehicle exterior notification device performs the vehicle exterior notification at least by emitting light, a plurality of vehicle exterior notification modes include blink of the light, and when the vehicle exterior notification controller causes the vehicle exterior notification to be performed by blinking the light, the vehicle exterior notification device performs the vehicle exterior notification that blinks the light at a cycle different from a blinking cycle of a turn lamp of the vehicle.

8. The vehicle notification control device according to claim 1, wherein the vehicle exterior notification device is configured to perform the vehicle exterior notification at least by display, the vehicle notification control device further includes a brightness identification unit configured to identify peripheral brightness in a periphery of the vehicle, and the vehicle exterior notification controller is configured to
increase brightness of the vehicle exterior notification as the peripheral brightness identified by the brightness identification unit increases and
decrease the brightness of the vehicle exterior notification as the peripheral brightness identified by the brightness identification unit decreases.

9. The vehicle notification control device according to claim 1, further comprising a vehicle interior notification device configured to perform vehicle interior notification that is notification indicating that the vehicle exterior notification has been performed toward an inside of the vehicle.

10. The vehicle notification control device according to claim 9, wherein the vehicle exterior notification device is configured to perform the vehicle exterior notification at least by display, the vehicle interior notification device is configured to display an image showing at least the vehicle, and the vehicle interior notification controller is configured to cause the vehicle interior notification device to perform the vehicle interior notification by vehicle interior notification display in a vehicle exterior notification area in an image that is displayed by the vehicle interior notification device and indicates the vehicle, and the vehicle interior notification is similar to the display of the vehicle exterior notification.

11. The vehicle notification control device according to claim 1, wherein the vehicle exterior notification device is configured to perform the vehicle exterior notification at least by light emission.

12. The vehicle notification control device according to claim 1, wherein the automated driving includes automated driving for automatically keeping the vehicle in a traveling lane and automated driving for automatically changing the traveling lane, the vehicle exterior notification device is configured to perform the vehicle exterior notification at least by light emission, the state identification unit is configured to distinguish at least whether automatic lane change is being performed or automatic lane keeping traveling is being performed to identify the automated driving-related state, when the state identification unit identifies, as the automated driving-related state, that the automatic lane keeping traveling is being performed, the vehicle exterior notification controller causes the vehicle exterior notification of lighting, and when the state identification unit identifies, as the automated driving-related state, that the automatic lane change is being performed, the vehicle exterior notification controller causes the vehicle exterior notification to blink.

13. The vehicle notification control device according to claim 12, wherein
when the state identification unit identifies, as the automated driving-related state, that the automatic lane change is being performed, the vehicle exterior notification controller causes the vehicle exterior notification of the blink at a cycle identical with a blinking cycle of a turn lamp of the vehicle.

14. The vehicle notification control device according to claim 12, further comprising:
a monitoring identification unit configured to identify whether a driver of the vehicle is monitoring a periphery of the vehicle, and
when the state identification unit identifies, as the automated driving-related state, that the automatic lane change has been performed, the vehicle exterior notification controller changes a mode of the vehicle exterior notification according to whether the monitoring identification unit has identified whether the driver is monitoring the periphery.

15. The vehicle notification control device according to claim 14, wherein
in a case where the state identification unit identifies, as the automated driving-related state, that the automatic lane change has been performed,
when the monitoring identification unit identifies that the driver is monitoring the periphery, the vehicle exterior notification controller may not cause the vehicle exterior notification, and
when the monitoring identification unit identifies that the driver is not monitoring the periphery, the vehicle exterior notification controller causes the vehicle exterior notification of the blink.

16. The vehicle notification control device according to claim 1, wherein
the automated driving includes automated driving without a periphery monitoring obligation of a driver of the vehicle,
the state identification unit at least distinguishes whether the automated driving without the periphery monitoring obligation is being performed on a general road or on an expressway to identify the automated driving-related state,
when the state identification unit identifies that the automated driving without the monitoring obligation is being performed on a general road, the vehicle exterior notification controller causes the vehicle exterior notification by audio,
when the state identification unit identifies that the automated driving without the monitoring obligation is being performed on an expressway, the vehicle exterior notification controller causes the vehicle exterior notification by display or light emission.

17. The vehicle notification control device according to claim 16, wherein
the state identification unit distinguishes whether a passerby has been detected to identify the automated driving-related state, and
in a case where the state identification unit identifies that the automated driving without the monitoring obligation has been performed on the general road, when the state identification unit identifies that the passerby has been detected, the vehicle exterior notification controller causes the vehicle exterior notification by the audio.

18. A vehicle notification control device for a vehicle capable of: performing automated driving at a plurality of automation levels; and switching the plurality of automation levels each indicating a degree of the automated driving, the vehicle notification control device comprising:
a state identification unit configured to identify an automated driving-related state that is a state of the vehicle, the state being related to the automated driving; and
a vehicle exterior notification controller configured to control a vehicle exterior notification device that performs vehicle exterior notification that is notification of information related to the automated driving toward an outside of the vehicle,
wherein
the vehicle exterior notification controller changes a type of the vehicle exterior notification according to the automated driving-related state identified by the state identification unit,
the vehicle notification control device is usable for a vehicle using a dead man system that causes: the vehicle to automatically perform evacuation action; a hazard lamp to blink; and a horn to sound when detecting a state where a driver of the vehicle is unable to perform driving,
the state identification unit is configured to distinguish whether the dead man system causes the vehicle to perform the evacuation action to identify the automated driving-related state, and
when the state identification unit identifies that the dead man system causes the vehicle to perform the evacuation action, the vehicle exterior notification controller causes the vehicle exterior notification together with execution of blinking the hazard lamp and execution of sounding the horn.

19. The vehicle notification control device according to claim 18, wherein
the vehicle exterior notification device is configured to perform the vehicle exterior notification at least by light emission, and
when the state identification unit identifies that the dead man system causes the vehicle to perform the evacuation action, the vehicle exterior notification controller causes the vehicle exterior notification to blink at a cycle identical with a cycle of the execution of blinking the hazard lamp.

20. A vehicle notification control method for a vehicle capable of: performing automated driving at a plurality of automation levels; and switching the plurality of automation levels each indicating a degree of the automated driving, the vehicle notification control method causes at least one processor to:
identify an automated driving-related state that is a state of the vehicle, the state being related to the automated driving;
control a vehicle exterior notification device that performs vehicle exterior notification that is notification of information related to the automated driving toward an outside of the vehicle; and
change a type of the vehicle exterior notification according to the identified automated driving-related state,
wherein
the vehicle notification control method is usable for a vehicle capable of performing automated driving at the plurality of automation levels each having a different permission condition that enables the automated driving,
the at least one processor is configured to distinguish at least the automated driving with the different permission condition to identify the automated driving-related state, the at least one processor uses the automated driving-related state identified to change a type of the vehicle exterior notification in the automated driving with the different permission condition, the plurality of automation levels include a predictable automation level that requires a predictable duration, the predictable duration is a distance or a time length for enabling continuation of the automated driving, the at least one processor identifies the predictable duration as the automated driving-related state, and the at least one processor uses the automated driving-related state identified to change the type of the vehicle exterior notification according to the predictable duration during the automated driving at the predictable automation level that requires the predictable duration.

21. A vehicle notification control device for a vehicle capable of: performing automated driving at a plurality of automation levels; and switching the plurality of automation levels each indicating a degree of the automated driving, the vehicle notification control device comprising a processor configured to identify an automated driving-related state that is a state of the vehicle, the state being related to the automated driving;

control a vehicle exterior notification device that performs vehicle exterior notification that is notification of information related to the automated driving toward an outside of the vehicle; and change a type of the vehicle exterior notification according to the identified automated driving-related state, wherein the vehicle notification control device is usable for a vehicle capable of performing automated driving at the plurality of automation levels each having a different permission condition that enables the automated driving, the processor is configured to distinguish at least the automated driving with the different permission condition to identify the automated driving-related state, the processor uses the automated driving-related state identified to change a type of the vehicle exterior notification in the automated driving with the different permission condition, the plurality of automation levels include a predictable automation level that requires a predictable duration, the predictable duration is a distance or a time length for enabling continuation of the automated driving, the processor identifies the predictable duration as the automated driving-related state, and the processor uses the automated driving-related state identified to change the type of the vehicle exterior notification according to the predictable duration during the automated driving at the predictable automation level that requires the predictable duration.

22. A vehicle notification control method for a vehicle capable of: performing automated driving at a plurality of automation levels; and switching the plurality of automation levels each indicating a degree of the automated driving, the vehicle notification control method causes at least one processor to:

identify an automated driving-related state that is a state of the vehicle, the state being related to the automated driving;

control a vehicle exterior notification device that performs vehicle exterior notification that is notification of information related to the automated driving toward an outside of the vehicle; and change a type of the vehicle exterior notification according to the identified automated driving-related state, wherein the vehicle notification control method is usable for a vehicle using a dead man system that causes: the vehicle to automatically perform evacuation action; a hazard lamp to blink; and a horn to sound when detecting a state where a driver of the vehicle is unable to perform driving, the at least one processor is configured to distinguish whether the dead man system causes the vehicle to perform the evacuation action to identify the automated driving-related state, and when the at least one processor identifies that the dead man system causes the vehicle to perform the evacuation action, the at least one processor causes the vehicle exterior notification together with execution of blinking the hazard lamp and execution of sounding the horn.

23. A vehicle notification control device for a vehicle capable of: performing automated driving at a plurality of automation levels; and switching the plurality of automation levels each indicating a degree of the automated driving, the vehicle notification control device comprising a processor configured to identify an automated driving-related state that is a state of the vehicle, the state being related to the automated driving;

control a vehicle exterior notification device that performs vehicle exterior notification that is notification of information related to the automated driving toward an outside of the vehicle; and change a type of the vehicle exterior notification according to the identified automated driving-related state, wherein the vehicle notification control device is usable for a vehicle using a dead man system that causes: the vehicle to automatically perform evacuation action; a hazard lamp to blink; and a horn to sound when detecting a state where a driver of the vehicle is unable to perform driving, the processor is configured to distinguish whether the dead man system causes the vehicle to perform the evacuation action to identify the automated driving-related state, and when the processor identifies that the dead man system causes the vehicle to perform the evacuation action, the processor causes the vehicle exterior notification together with execution of blinking the hazard lamp and execution of sounding the horn.

* * * * *